(12) United States Patent
Tian et al.

(10) Patent No.: US 9,979,939 B2
(45) Date of Patent: May 22, 2018

(54) LIGHT SOURCE ASSEMBLY AND LASER PROJECTOR

(71) Applicant: Hisense Co., Ltd., Qingdao (CN)

(72) Inventors: Youliang Tian, Qingdao (CN); Wei Li, Qingdao (CN); Xianrong Liu, Qingdao (CN)

(73) Assignees: HISENSE CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 0 days. days.

(21) Appl. No.: 15/392,012

(22) Filed: Dec. 28, 2016

(65) Prior Publication Data

US 2017/0111621 A1   Apr. 20, 2017

(30) Foreign Application Priority Data

Jun. 30, 2016   (CN) .......................... 2016 1 0511521
Jul. 1, 2016    (CN) .......................... 2016 1 0502781

(51) Int. Cl.
| | |
|---|---|
| *G03B 21/20* | (2006.01) |
| *H04N 9/31* | (2006.01) |
| *G02B 26/08* | (2006.01) |
| *G02B 26/00* | (2006.01) |
| *G02B 27/48* | (2006.01) |

(52) U.S. Cl.
CPC ......... *H04N 9/3155* (2013.01); *G02B 26/008* (2013.01); *G02B 26/0808* (2013.01);
(Continued)

(58) Field of Classification Search
CPC .............. G03B 21/2046; G03B 21/206; G03B 21/208; G03B 21/204; G03B 21/2033;
(Continued)

(56) References Cited

U.S. PATENT DOCUMENTS 8,727,543 B2 *  5/2014  Kurashige ............ G02B 5/0252
                                              353/38
2003/0039036 A1 * 2/2003  Kruschwitz ........ G02B 27/0927
                                              359/707
(Continued)

FOREIGN PATENT DOCUMENTS

CN        1665285 A     9/2005
CN        1790094 A     6/2006
(Continued)

OTHER PUBLICATIONS

Office Action from corresponding Chinese Application No. 201610502781.3 dated Jan. 23, 2018 (6 pages).

*Primary Examiner* — Ryan Howard
(74) *Attorney, Agent, or Firm* — Harness, Dickey & Pierce, P.L.C.

(57) ABSTRACT

The disclosure discloses a light source assembly and a laser projector. An embodiment of the disclosure provides a light source assembly including a laser light emitter in at least one color, and a light guiding element arranged in a light path over which a light beam of the laser light emitter is transmitted; the light guiding element is configured to be moved to change the emergent angle of laser light beam being transmitted, thus adjusting the light path conveniently.

17 Claims, 14 Drawing Sheets

(52) U.S. Cl.
CPC ..... G02B 26/0833 (2013.01); G02B 26/0875 (2013.01); G02B 27/48 (2013.01); G03B 21/2046 (2013.01); H04N 9/3114 (2013.01); H04N 9/3161 (2013.01); H04N 9/3164 (2013.01)

(58) Field of Classification Search
CPC .. H04N 9/3155; H04N 9/3188; H04N 9/3161; G02B 26/0808; G02B 26/0816
See application file for complete search history.

(56) References Cited

U.S. PATENT DOCUMENTS

| | | |
|---|---|---|
| 2004/0239889 A1 | 12/2004 | Inamoto |
| 2008/0111973 A1 | 5/2008 | Aruga |
| 2008/0198334 A1* | 8/2008 | Kasazumi .............. G02B 27/48 353/38 |

FOREIGN PATENT DOCUMENTS

| | | |
|---|---|---|
| CN | 101051179 A | 10/2007 |
| CN | 101093284 A | 12/2007 |
| CN | 101142524 A | 3/2008 |
| CN | 102129130 A | 7/2011 |
| CN | 103597400 A | 2/2014 |
| CN | 105388691 A | 3/2016 |
| CN | 105573039 A | 5/2016 |
| EP | 1292134 A2 | 3/2003 |
| JP | 2009169012 A | 7/2009 |
| WO | WO-2015098120 A1 | 7/2015 |

\* cited by examiner

Optical axis of 0 degree

Optical axis of 0 degree

LIGHT SOURCE ASSEMBLY AND LASER PROJECTOR

CROSS-REFERENCE TO RELATED APPLICATIONS

This application claims the benefit and priority of Chinese Patent Application No. 201610511521.2 filed Jun. 30, 2016 and Chinese Patent Application No. 201610502781.3 filed Jul. 1, 2016. The entire disclosures of the above applications are incorporated herein by reference.

FIELD

The present disclosure relates to the field of projection, and particularly to a light source assembly and a laser projector.

BACKGROUND

This section provides background information related to the present disclosure which is not necessarily prior art.

Laser is a high-brightness and strong directional light source, which emitting a monochromatic coherent light beam, and the laser light source which is an excellent coherent light source has been increasingly widely applied in a number of fields due to its advantages of good monochromaticity, strong directivity, a high optical flux, etc.

In the field of projection, the laser light source is commonly applicable to a projector as a projection light source. The laser light source applicable to the projector typically includes an array of laser devices consisted of small-power laser devices, and provide light in one or two of the three primary colors, where light beams emitted by the laser devices in the array of laser devices are shaped, and then transmitted over a light path to a fluorescence wheel to excite fluorescence powder to generate light in the other ones of the three primary colors for illumination.

However if the position of some optical element in the light path is changed, or the light path needs to be changed, then it may be very troublesome to readjust the light path due to the precision of the precision of the light path.

SUMMARY

This section provides a general summary of the disclosure, and is not a comprehensive disclosure of its full scope or all of its features.

Embodiments of the disclosure provide a light source assembly and a laser projector so as to simplify the adjustment to a light path.

An embodiment of the disclosure provides a light source assembly including:

a laser light emitter in at least one color;

a light guiding element arranged in a light path over which a light beam of the laser light emitter is transmitted; and the light guiding element is configured to be moved to change the emergent angle of laser light beam being transmitted.

Another embodiment of the disclosure provides a laser projector, comprising an optical machine, a lens, and a light source assembly, wherein:

the light source assembly comprises a laser light emitter in at least one color, and a light guiding element arranged in a light path over which a light beam of the laser light emitter is transmitted;

wherein the light guiding element is configured to be moved to change the emergent angle of laser light beam being transmitted; and the light source assembly is configured to illuminate the optical machine, and the optical machine is configured to modulate the light beam of the light source assembly, and to output the modulated light beam to the lens for imaging, so that an image is projected to a projection medium, thus resulting in the projected image.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 7:
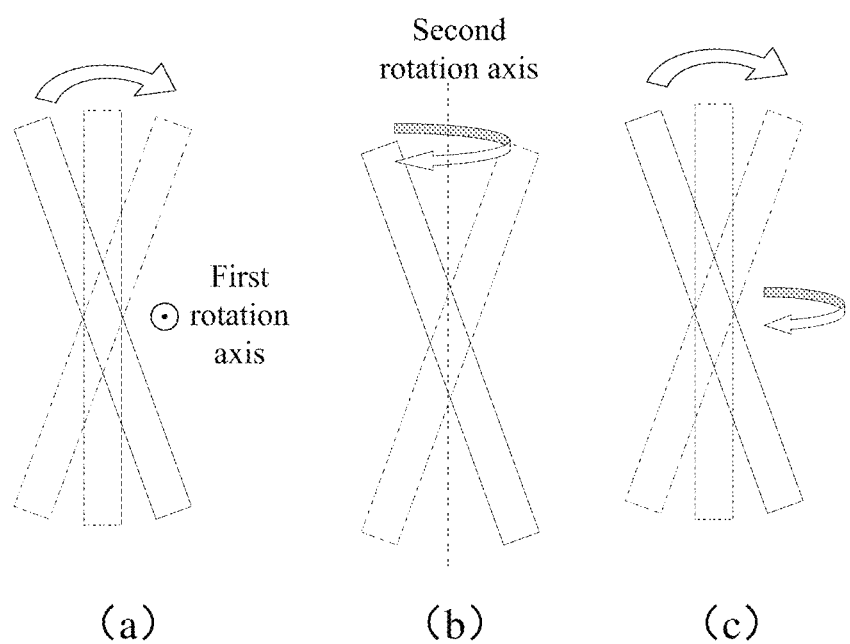
Figure 8:
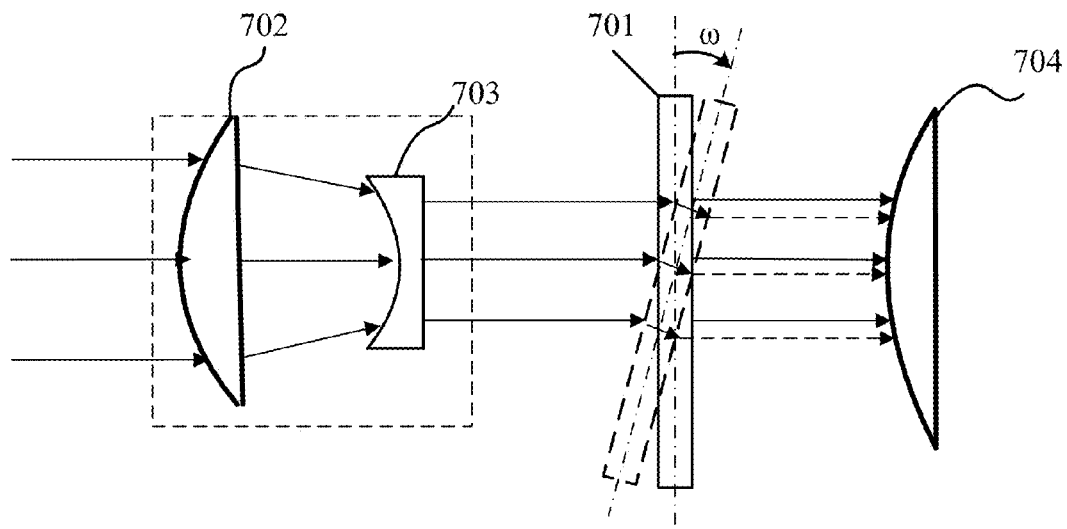
Figure 9:
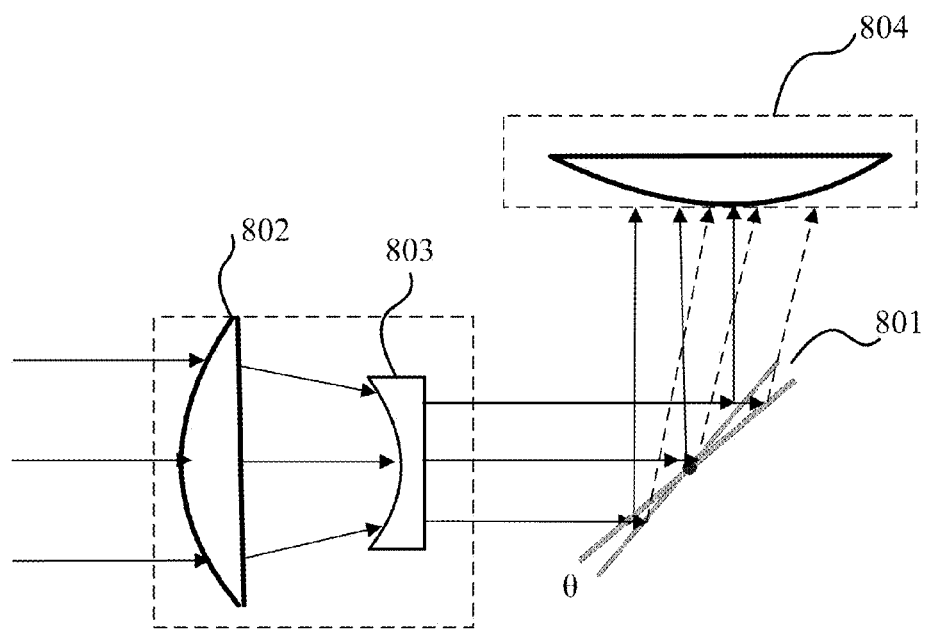
Figure 10:
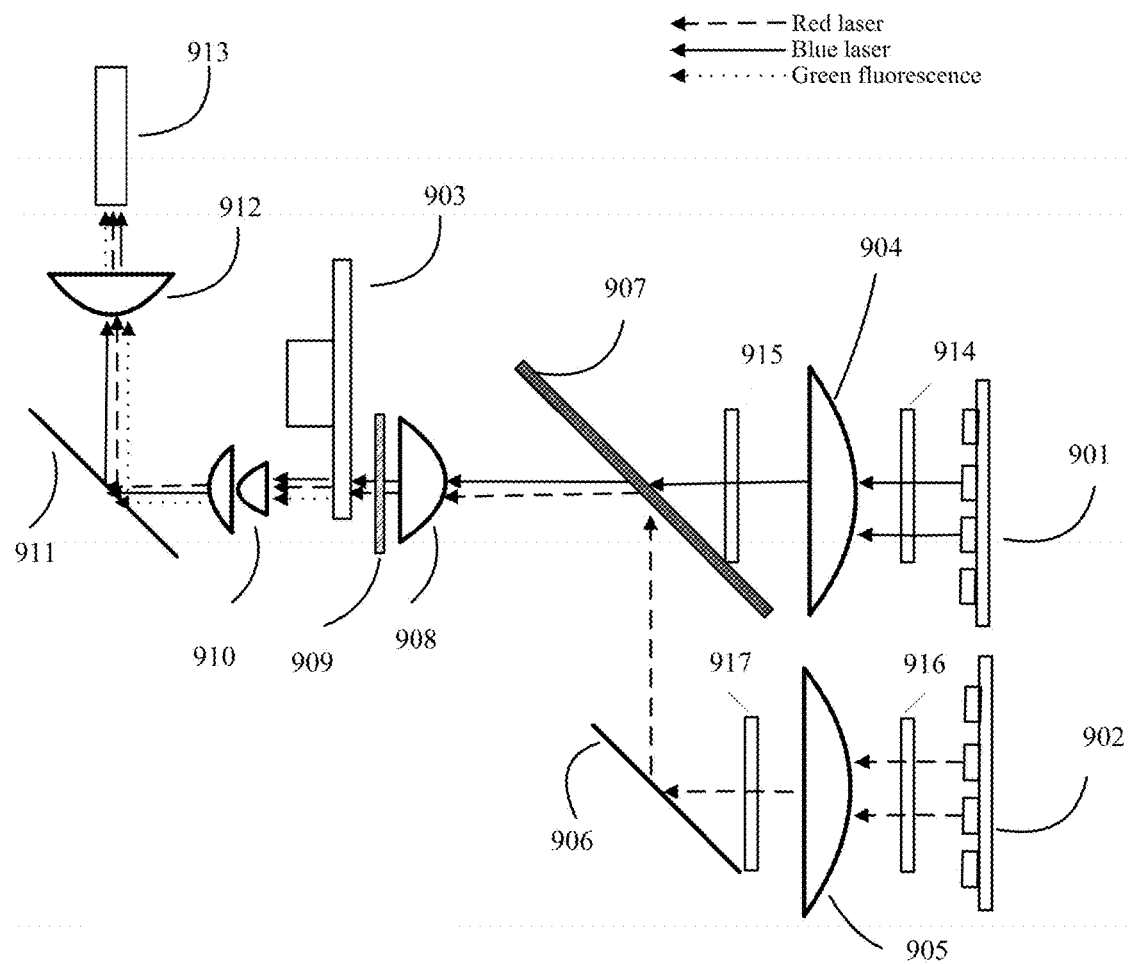
Figure 11:
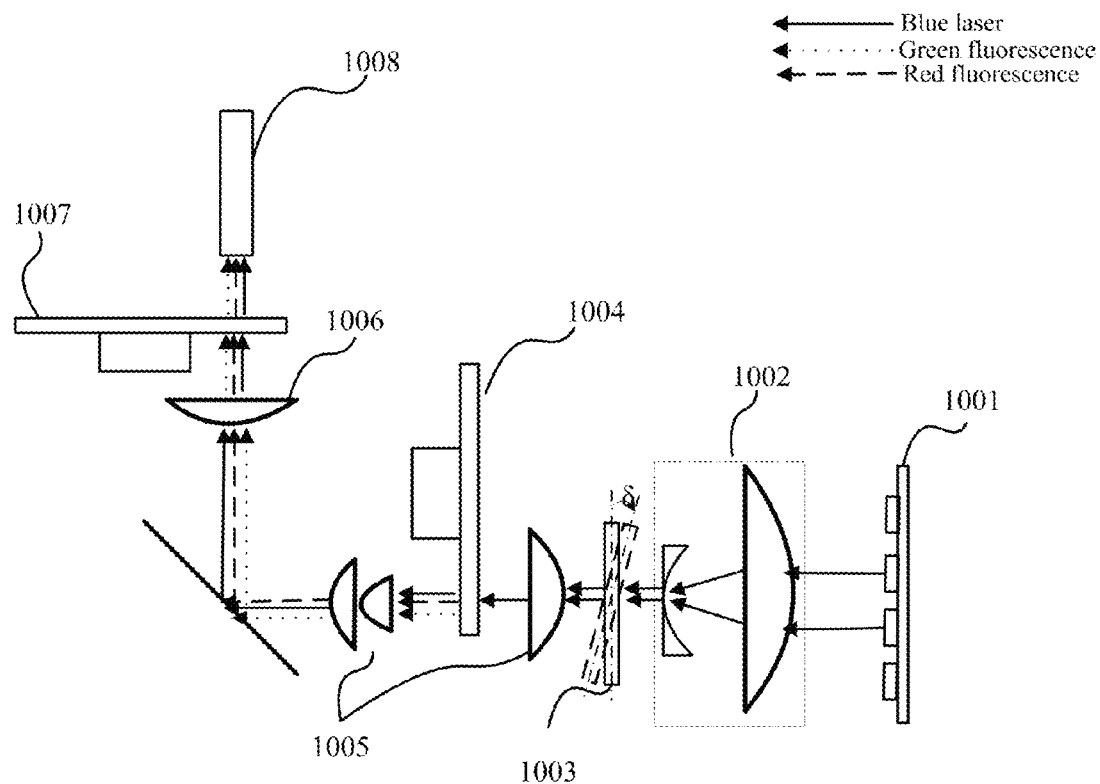
Figure 12:
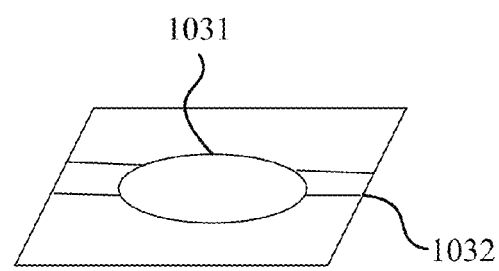
Figure 13:
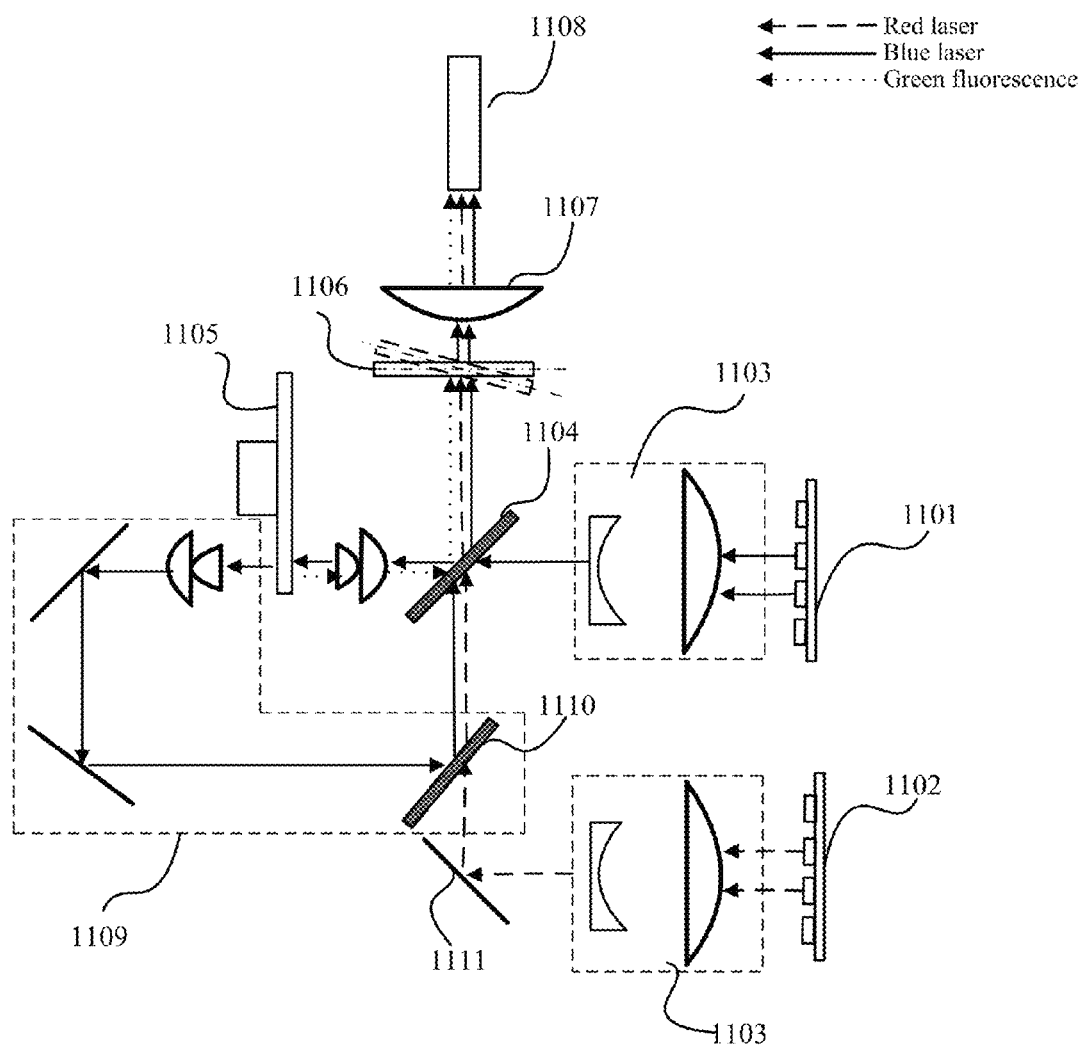
Figure 14A:
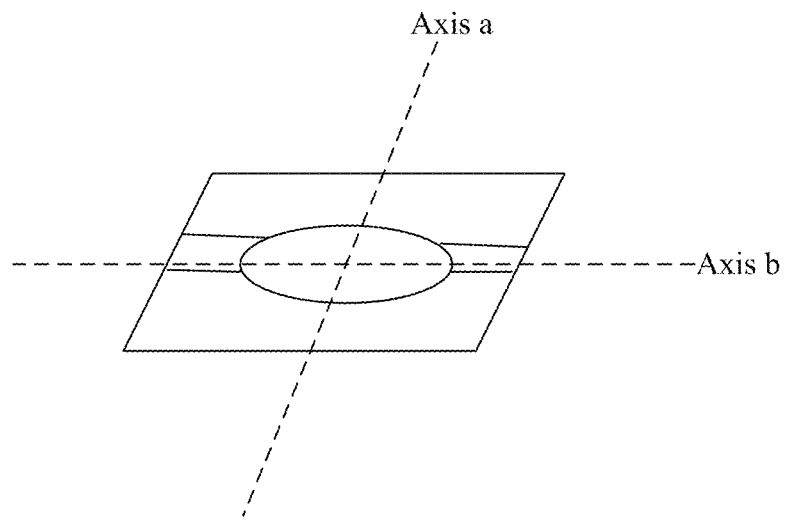
Figure 14B:
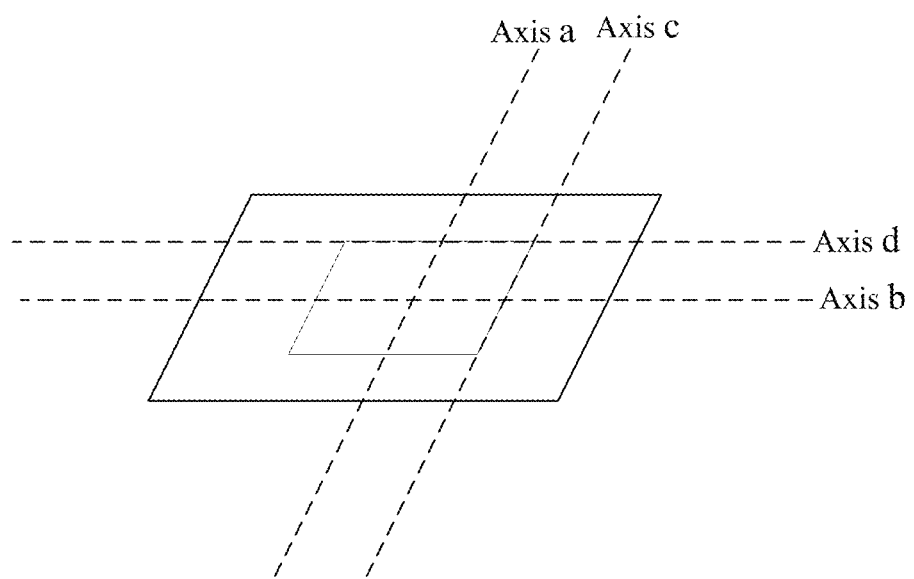
Figure 15:
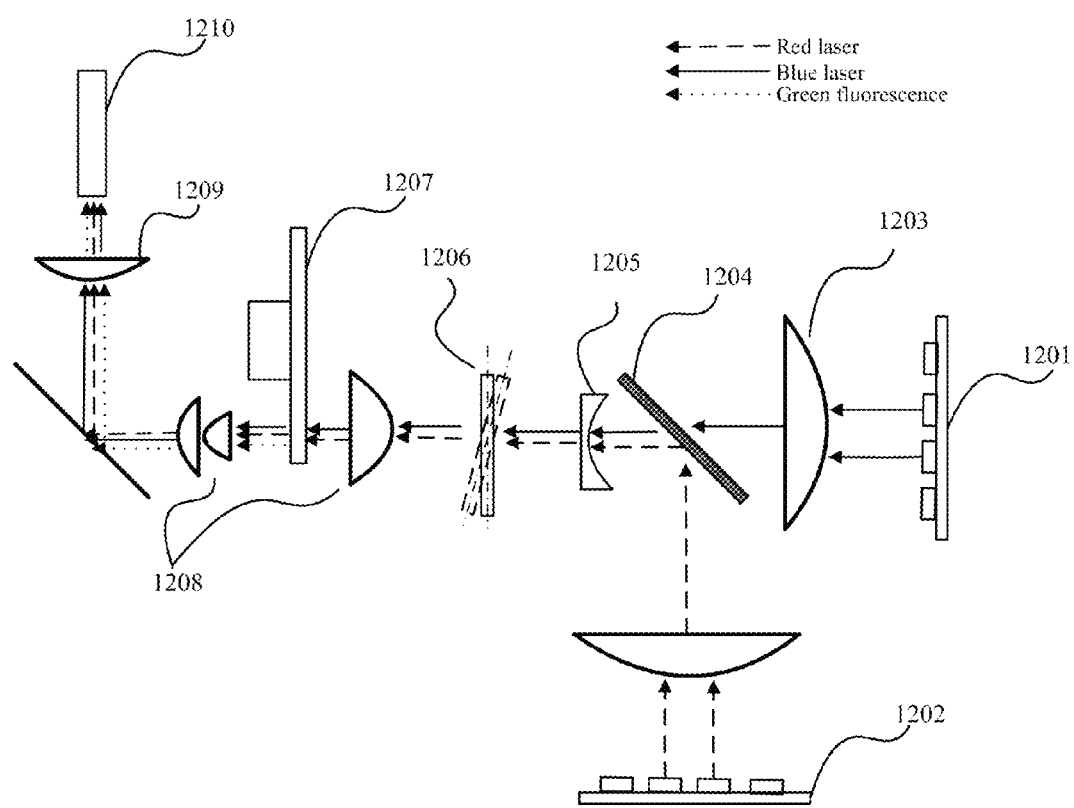
Figure 16:
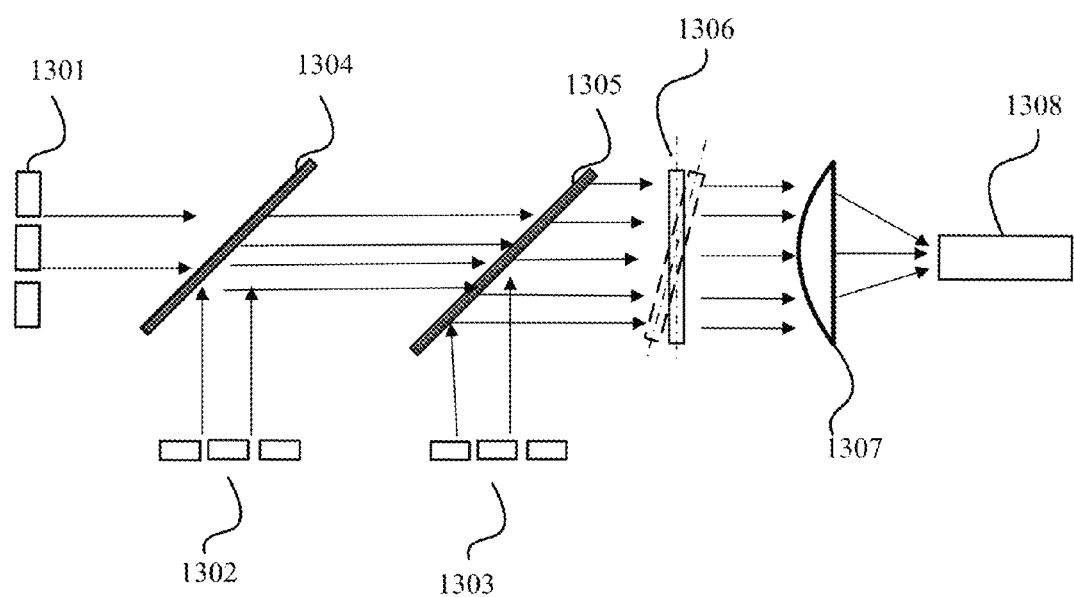
Figure 17:
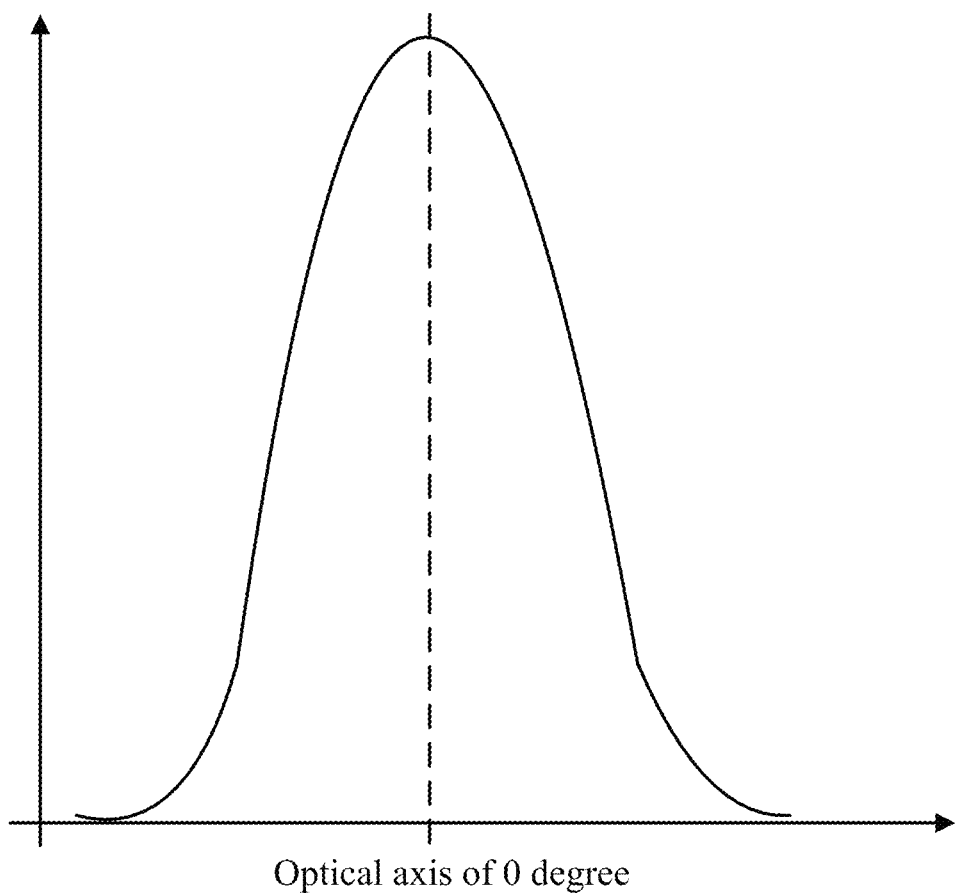
Figure 18A:
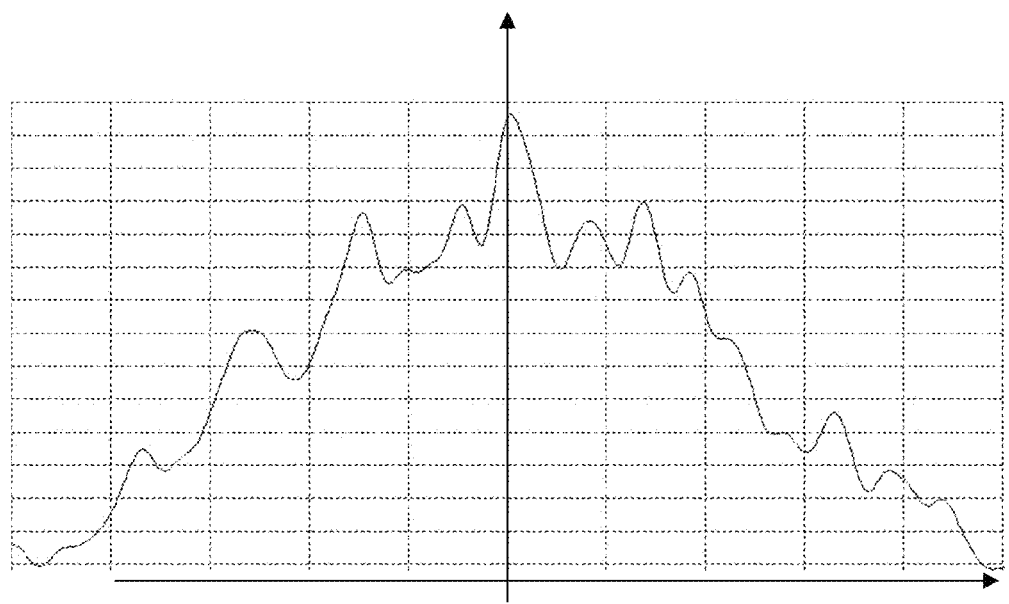
Figure 18B:
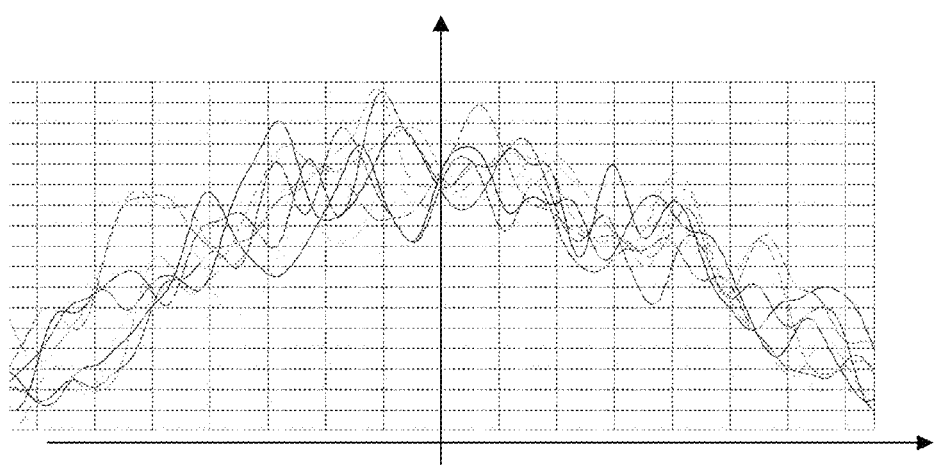
Figure 19A:
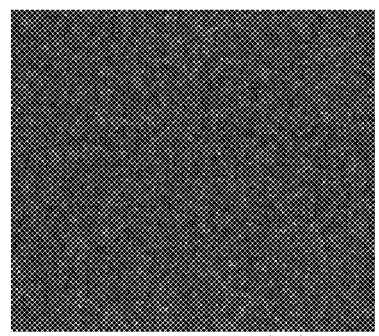
Figure 19B:
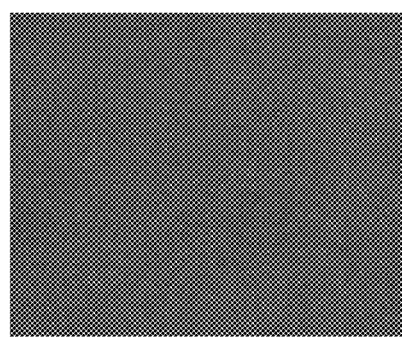
Figure 20:
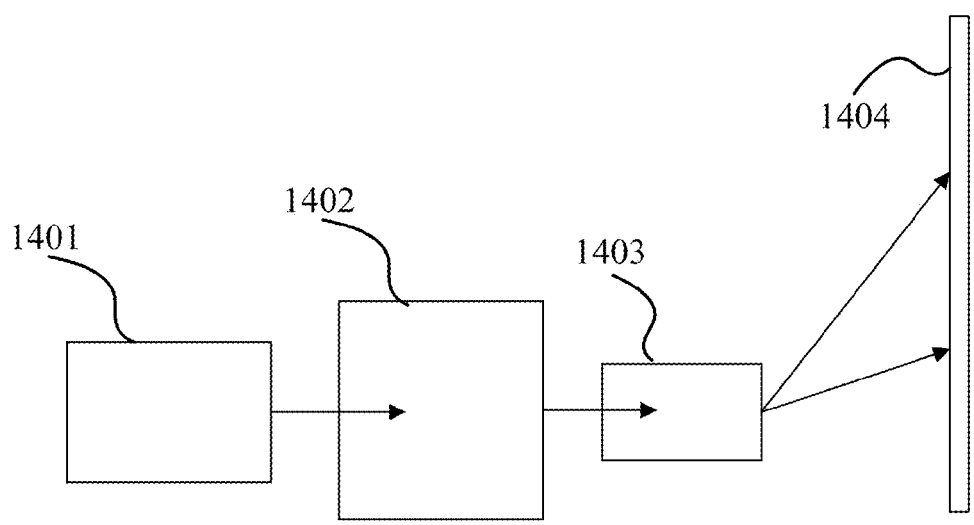

(*a*), (*b*) and (*c*) of FIG. 7 are schematic diagrams of a light guiding element being rotated according to an embodiment of the disclosure;

FIG. 8 is a schematic structural diagram of a light source assembly according to an embodiment of the disclosure;

FIG. 9 is a schematic structural diagram of a light source assembly according to an embodiment of the disclosure;

FIG. 10 is a schematic structural diagram of a light source assembly in a dichromatic light source architecture according to an embodiment of the disclosure;

FIG. 11 is a schematic architectural diagram of another light source assembly according to an embodiment of the disclosure;

FIG. 12 is a schematic structural diagram of a light guiding element according to an embodiment of the disclosure;

FIG. 13 is a schematic diagram of a light guiding element moving according to an embodiment of the disclosure;

FIG. 14*a* and FIG. 14*b* are schematic diagrams of a light guiding element moving according to an embodiment of the disclosure;

FIG. 15 is a schematic structural diagram of a light source assembly according to an embodiment of the disclosure;

FIG. 16 is a schematic structural diagram of a light source assembly according to an embodiment of the disclosure;

FIG. 17 is a schematic diagram of a Gaussian distribution of a laser light beam;

FIG. 18*a* and FIG. 18*b* are schematic diagrams of an angle vs. energy distribution of a laser light beam according to an embodiment of the disclosure;

FIG. 19a and FIG. 19b are schematic comparison diagrams of a speckle effect according to an embodiment of the disclosure; and FIG. 20 is a schematic structural diagram of a laser projector according to an embodiment of the disclosure.

Corresponding reference numerals indicate corresponding parts or features throughout the several views of the drawings.

DETAILED DESCRIPTION

Example embodiments will now be described more fully with reference to the accompanying drawings.

There are generally a large number of optical lenses in a laser light source assembly, which can typically include convex lens, concave lens, coated lens, a group of condenser lens, and other optical lens. A light beam, emitted by a laser device, passing the respective lenses in an optical path is refracted or transmitted for optical processing.

An embodiment of the disclosure provides a light source assembly including a laser light emitter in at least one color, a light guiding element arranged in a light path over which a light beam of the laser light emitter is transmitted; and the light guiding element is configured to be moved to change the emergent angle of laser light beam being transmitted.

Figure 1:
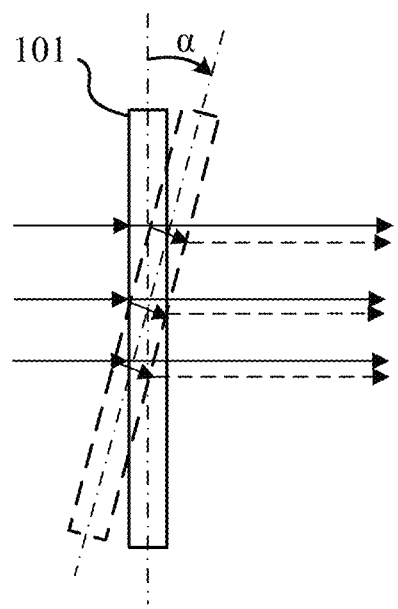
FIG. 1 is a schematic diagram of the emergent angle of a light beam varying with a moving light guiding element in a light source according to an embodiment of the disclosure.

FIG. 1 illustrates a light guiding element 101 arranged in the transmission light path of the light beam, and as can be seen from FIG. 1, the light guiding element is configured to be rotated, so that the light beam can be guided to be transmitted through the light guiding element 101, and then exit at a changed angle. In FIG. 1, emergent light represented as a solid line is emergent light after the light beam is transmitted through the light guiding element 101 which is not rotated, and emergent light represented as a dotted line is emergent light after the light beam is transmitted through the light guiding element 101 which has been rotated at an angle of a. Of course, the movement of the light guiding element as a result of being driven will not be limited to rotation, but can alternatively be vibration, or another form of movement.

Furthermore there may be such a plurality of light guiding elements arranged in the transmission light path of the light beam of the laser light emitter that can be arranged before or after any one optical element in the transmission light path of the light beam, so that if the light path needs to be adjusted, then the light guiding elements will be driven to be moved to thereby change the light path.

Figure 2:
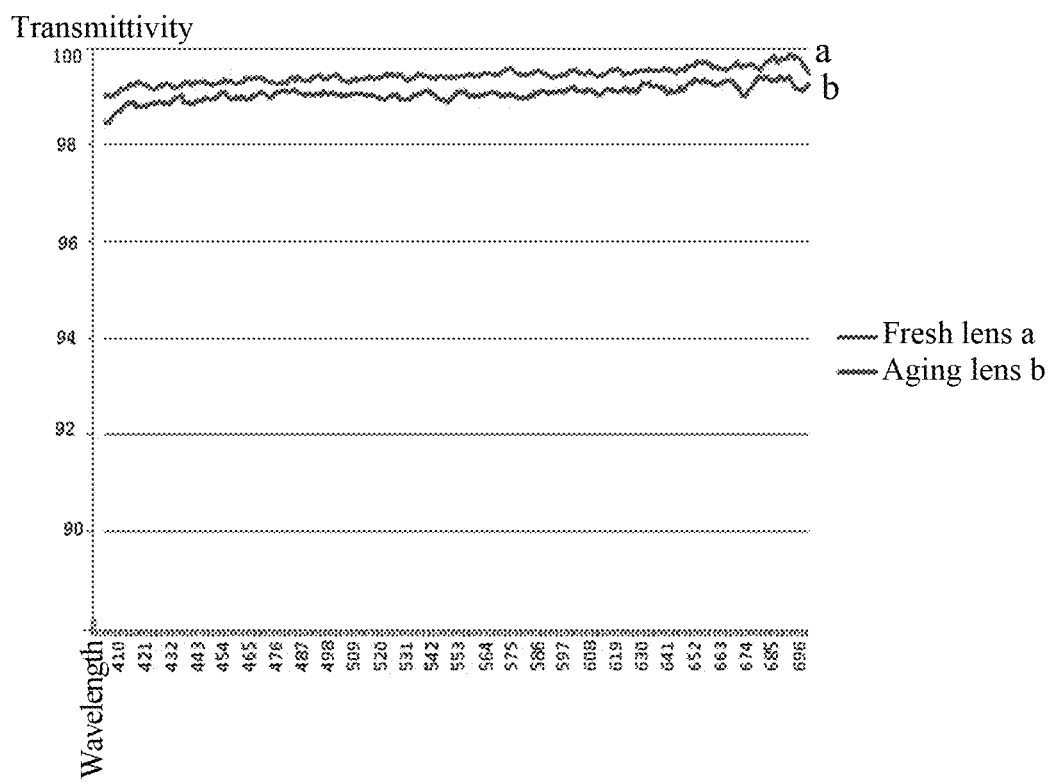
FIG. 2 is a schematic diagram of spectrum attenuation curves before and after an optical lens ages.

As there is a demand for growing brightness of a projected image, the power of the laser light emitter is also increasing, and the high-energy characteristic of the laser light beam requires the optical lens in the light path to be robust against high temperature, not to be deformable, and to have a stable optical characteristic, but in a real application, a thermal effect of the laser light beam will have a negative influence upon the transmittivity and the service lifetime of an optical lens in that if the optical lens has been illuminated locally by light energy at a high density for a long period of time, then the surface thereof may be deformed, the local optical characteristic thereof will be more degraded, and some segment plated with a film will aged, thus sharply lowering the efficiency of processing the light, and shortening the service lifetime of the optical lens. FIG. 2 illustrates a schematic diagram of spectrum attenuation curves before and after some optical lens ages, and as can be apparent, the transmittivity of the optical lens after aging (the curve b illustrated in FIG. 2) is generally lower than the transmittivity thereof before aging (the curve as illustrated in FIG. 2).

In view of this, it is highly desirable in the industry to investigate and address how to improve the service lifetime of an optical lens in a laser light source assembly.

Figure 3:
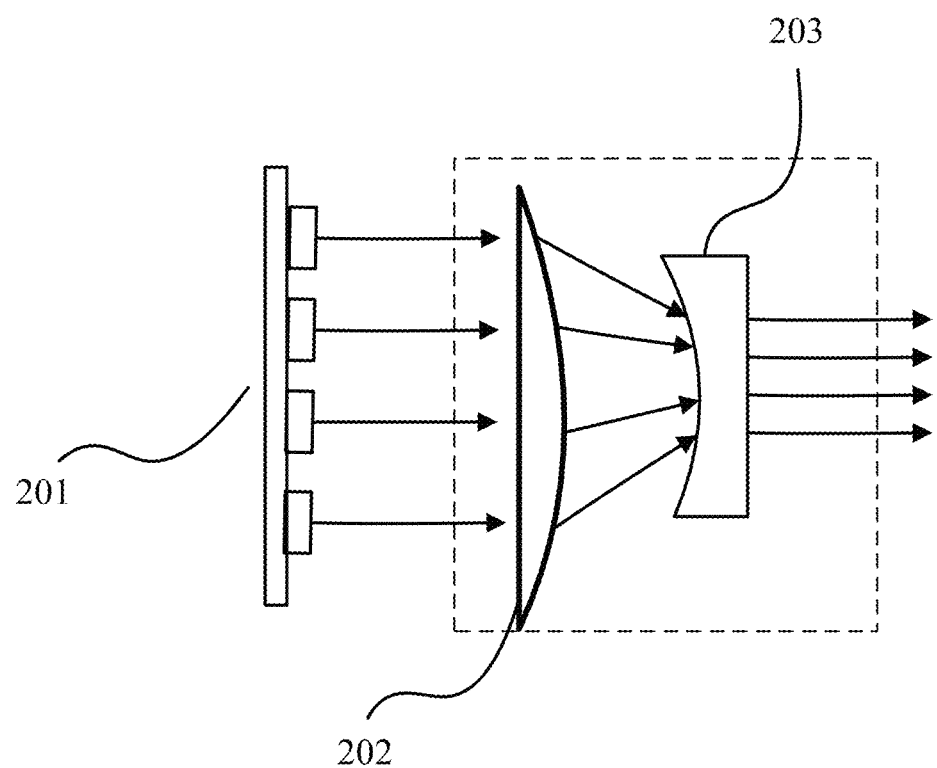
FIG. 3 is a schematic diagram of a shaped light path of the laser light beam in the light source assembly.

FIG. 3 illustrates a schematic diagram of a shaped light path of the laser light beam in the light source assembly.

As illustrated in FIG. 3, a laser light source assembly including an array of laser devices (or a group of laser devices) 201 emits a laser light beam so that the laser light beam is incident onto a convex lens 202 as parallel light beams, and converged, and then arrives at a concave lens 203, and the concave lens diffuses the light beams tending to be converged, thus resulting in parallel light beams again. As can be apparent, the light beams passing the convex lens 202 and the concave lens 203 are compressed into a laser light beam with a smaller area thereof.

Figure 4:
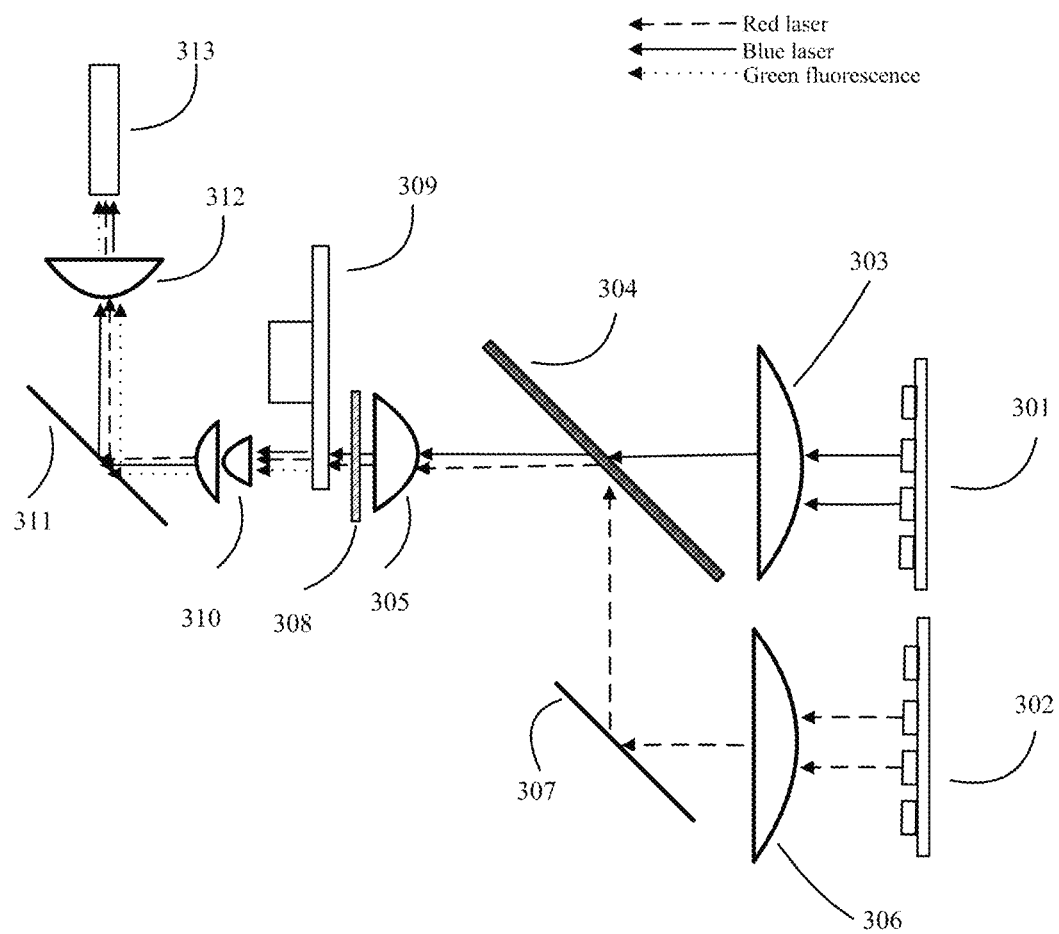
FIG. 4 is a schematic structural diagram of a light source assembly in a dichromatic light source architecture.

FIG. 4 illustrates a schematic structural diagram of an example of laser light source assembly in a dichromatic light source architecture.

As illustrated in FIG. 4, an array of laser devices 301 provide blue laser, and an array of laser devices 302 provides red laser, where the blue laser passing a convex lens 303 arrives at a dichroic lens 304, and is further transmitted to a focusing lens 305 through the dichroic lens 304; and the red laser passing a convex lens 306 and a reflecting mirror 307 arrives at the dichroic lens 304, and is further reflected to the focusing lens 305 through the dichroic lens 304, so that the blue laser and the red laser is incident onto a transmission-type fluorescence wheel 309 (including a transparent substrate and a layer of fluorescence powder) through the focusing lens 305 and a diffusing sheet 308, where there are a blue light transmission area and a fluorescence powder area arranged on the fluorescence wheel 309, and the fluorescence powder includes at least green fluorescence powder which can be excited to generate green fluorescence to thereby form the three primary colors together with the blue laser and the red laser. The green fluorescence, the blue laser, and the red laser is transmitted to the backside of the fluorescence wheel 309 in sequence, passes a group of condenser lens 310, and then is transmitted to an optical rod 313 over the same light path (e.g., a reflecting mirror 311 and a focusing lens 312 illustrated in FIG. 4), and equalized into an illuminating light beam.

As can be apparent, in the laser light source assembly, the light beam emitted from the array of laser devices is shaped by being narrowed into the smaller spot to be transmitted over the light path, and in order to achieve the highest efficiency of processing the light, typically the spot is incident onto the center of the optical lens where the light is processed with the highest efficiency, for example, light rays tend to be refractively deformed at the edge of a convex lens, and strongly converged at the center of the convex lens, and in the neighborhood of the center, where a lower percentage of the light rays are loss at the center of the convex lens, and in the neighborhood of the center.

However it is typically not easy to change the positions of the respective optical lens, after the light path is well adjusted, due to the precision of the design of the light path. In use, such a position on an optical lens that has been illuminated by high-energy laser for a long period of time may be fogged so that the position on the lens which has been illuminated for a long period of time may be blurred, a white spot may be formed at the position, etc. As the fogged optical lens at the position has been illuminated for an increasing period of time, the area of the position may be gradually growing, and the transmittivity thereof may be gradually dropping, so that if the required reliability in the original design fails to be accommodated, then the element will need to be replaced. Particularly as there is a demand for growing brightness of a projected image, the power of the laser light emitter is also increasing, so that the surface of the optical lens locally illuminated by light energy at a high density is further deformed, and the efficiency of processing the light, and the service lifetime are further sharply degraded.

Typically the service lifetime of an optical lens can be measured as the number of hours before the transmittivity of the optical lens is lowered to 50% the original transmittivity thereof; or the number of hours before the brightness at the backend of the transmittivity is lowered to 50% the original brightness thereof.

There has been absent a working solution in the prior art to such a problem that in the laser light source assembly, there is such a position on which an optical lens that has been illuminated by high-energy laser at a high density for a long period of time, so that the optical characteristic may be constantly degraded, the efficiency of transmitting the light may be lowered, and the service lifetime of the optical lens may be shortened.

In order to address the drawbacks above in the existing laser light source assembly, and to improve the service lifetime of the optical lens in the laser light source assembly, embodiments of the disclosure provide a light source assembly and a laser projector. In the technical solutions according to the embodiments of the disclosure, for an optical lens to be illuminated by a laser light beam, a light guiding element arranged at the side thereof where the laser light beam is incident is configured to be moved, so that the laser light beam to be incident onto the optical lens is translated, or the incidence direction thereof is changed, such that the laser light beam can illuminate a constantly varying position on the optical lens to thereby avoid the high-energy laser light beam from illuminating the same position on the optical lens for a long period of time so as to alleviate the local optical characteristic from being degraded, for the effect of improving the service lifetime of the optical lens as a whole.

Particularly a laser light source assembly according to some embodiments of the disclosure includes an optical lens, where there is a light guiding element arranged at the side of the optical lens where a laser light beam is incident.

Furthermore the light guiding element is configured to be moved to thereby guide the laser light beam, which needs to be incident onto the optical lens, to be translated or to be incident in a changed direction.

Optionally the light guiding element can particularly be a reflective element or a transmissive element.

Since the light path over which the laser is transmitted is closely related to the optical characteristic of the optical element in use, the embodiments of the disclosure will be described below in details with reference to the drawings in connection with some embodiments of the disclosure in which the light guiding element is a transmissive element, and some embodiments of the disclosure in which the light guiding element is a reflective element respectively so as to make the technical solution according to the embodiments of the disclosure more apparent.

It shall be appreciated that the technical solution according to the embodiments of the disclosure will not be limited to any particular type of the light guiding element. Optionally in some embodiments of the disclosure, the light guiding element may be an optical element which does not change the density of the light energy of the laser light beam.

It shall be further appreciated that the technical solution according to the embodiments of the disclosure will not be limited to any particular type of optical lens. Optionally in the laser light source assembly according to some embodiments of the disclosure, for example, for a convex lens, a dichroic lens, or another optical lens through which a light beam can be transmitted, there may be a light guiding element arranged at the side thereof where the laser light beam is incident. The type of the light guiding element, and the particular position where it is arranged (or the optical lens corresponding to the light guiding element) can be determined particularly dependent upon an application of the technical solutions according to the embodiments of the disclosure in a real scenario.

Figure 5:
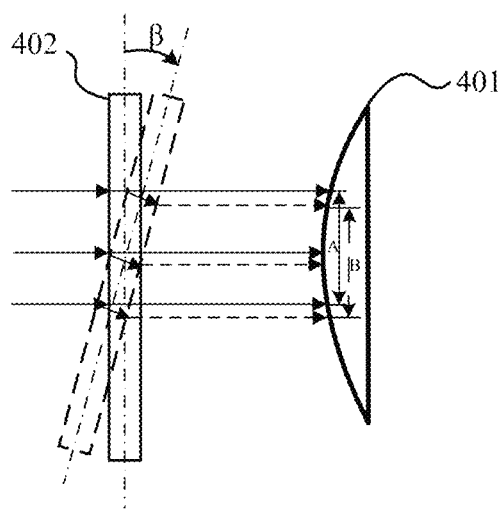
FIG. 5 is a schematic structural diagram of a light source assembly according to an embodiment of the disclosure.

FIG. 5 illustrates a schematic structural diagram of a light source assembly including a light guiding element which is a transmissive element according to some embodiments of the disclosure, where in the example as illustrated in FIG. 5, an optical lens 401 is particularly a convex lens.

In the light path as illustrated in FIG. 5, there is a light guiding element 402 (a transmissive element) arranged at the side of an optical lens 401 where a laser light beam is incident, where the light guiding element 402 is configured to be moved (to be rotated as illustrated in FIG. 5.)

As illustrated in FIG. 5, the laser light beam is incident onto the light guiding element 402, and transmitted through the light guiding element 402 (a emergent laser light beam represented as a solid line in FIG. 5), and then illuminates the optical lens 401, thus forming a spot at the position A; and after the light guiding element 402 is driven to be rotated (for example, at an angle of β), the light guiding element 402 is inclined relative to the direction in which the laser light beam is incident, so that the incidence angle at which the laser light beam is incident onto the surface of the light guiding element 402 is changed accordingly; and since there is some thickness of the light guiding element 402, the laser light beam transmitted inside the light guiding element 402 is refracted, and then is refracted again on and exits from the other surface (an emergent laser light beam represented as a dotted line in FIG. 5) under the refraction law, so that the direction of the emergent laser light beam is translated parallel to the direction thereof before the light guiding element 402 is rotated, that is, the laser light beam incident onto the optical lens 401 is translated, and then the laser light beam illuminates the optical lens 401, thus forming a spot at the position B.

As can be apparent, the light guiding element 402 (the transmissive element) moves to thereby change the incident angle at which the laser light beam is incident onto the surface of the light guiding element 402, so that the emergent laser light beam transmitted through the light guiding element 402 (the transmissive element) (i.e., the laser light beam incident onto the optical lens 401) is translated, and further illuminates the optical lens, thus forming the spot at the different position.

Optionally in some embodiments of the disclosure where the light guiding element is a transmissive element, the transmissive element is configured to be rotated at an angle ranging from −5 to 5 degrees.

Optionally in some embodiments of the disclosure where the light guiding element is a transmissive element, the surface of the transmissive element is smooth.

Optionally in some embodiments of the disclosure where the light guiding element is a transmissive element, the transmissive element can particularly be a planar sheet of glass.

Optionally in some embodiments of the disclosure where the light guiding element is a transmissive element, the transmissive element is made of the same transparent material with a uniform thickness, e.g., a planar sheet of glass with a uniform thickness, etc.

Here if the thickness of the planar sheet of glass is too large, then there will be an increased loss of the light, and if the thickness of the planar sheet of glass is too small, then the position of the spot will not be significantly changed. Optionally the value of the thickness of the planar sheet of glass ranges from 3 to 5 millimeters.

Figure 6:
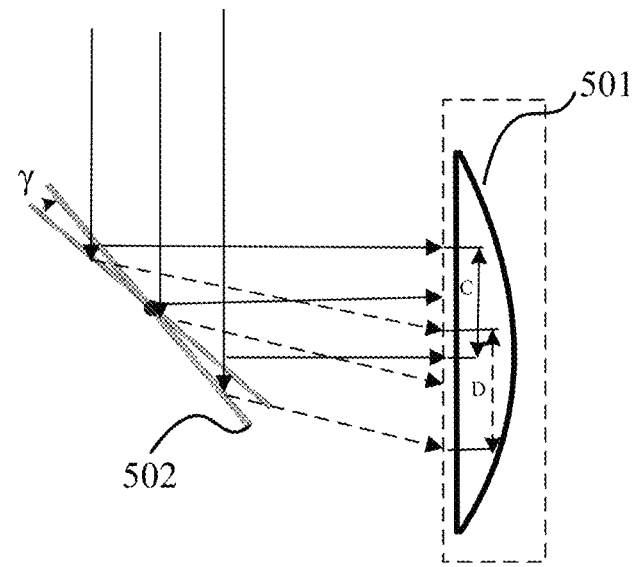
FIG. 6 is a schematic structural diagram of a light source assembly according to an embodiment of the disclosure.

FIG. 6 illustrates a schematic structural diagram of a light source assembly including a light guiding element which is a reflective element according to some embodiments of the disclosure, where in the example as illustrated in FIG. 6, an optical lens 501 is particularly a convex lens.

In the light path as illustrated in FIG. 6, there is a light guiding element 502 (a reflective element) arranged at the side of an optical lens 501 where a laser light beam is incident, where the light guiding element 502 is configured to be moved (to be rotated as illustrated in FIG. 6.)

As illustrated in FIG. 6, the laser light beam is incident onto the light guiding element 502, and reflected through the light guiding element 502 (an emergent laser light beam represented as a solid line in FIG. 6), and then illuminates the optical lens 501, thus forming a spot at the position C; and after the light guiding element 502 is driven to be rotated (for example, at an angle of γ), the incidence angle at which the laser light beam is incident onto the surface of the light guiding element 502 is changed accordingly, and under the reflection law, due to this change to the incidence angle, the emergent direction of the emergent laser light beam after the laser light beam is reflected through the light guiding element 502 (a emergent laser light beam represented as a dotted line in FIG. 6) is changed relative to the direction of the emergent laser light beam before the light guiding element 502 is rotated, that is, the incidence direction in which the laser light beam is incident onto the optical lens 501 is changed, and then the laser light beam illuminates the optical lens 501, thus forming a spot at the position D.

As can be apparent, the light guiding element 502 (the reflective element) moves to thereby change the incident angle at which the laser light beam is incident onto the surface of the light guiding element 502, so that the emergent direction of the emergent laser light beam reflected through the light guiding element 502 (the incidence direction in which the laser light beam is incident onto the optical lens 401) is changed, and the laser light beam further illuminates the optical lens, thus forming the spot at the different position.

Optionally in some embodiments of the disclosure where the light guiding element is a reflective element, the reflective element is configured to be rotated at a typically small angle which can particularly range from –N to N degrees, where N ranges from 0.3 to 0.5.

Optionally in some embodiments of the disclosure where the light guiding element is a reflective element, the surface of the reflective element at the incidence side where the laser light beam is received is smooth.

Optionally in some embodiments of the disclosure where the light guiding element is a reflective element, the reflective element can particularly be a plane mirror or a piezoelectric ceramic Micro-Electro-Mechanical System (MEMS) system.

Optionally in some embodiments of the disclosure where the light guiding element is a reflective element, the plane mirror can be configured to be rotated periodically at a rotation frequency which can particularly range from 300 to 500 Hz.

Optionally in some embodiments of the disclosure where the light guiding element is a piezoelectric ceramic MEMS vibration lens, the piezoelectric ceramic MEMS vibration lens can be configured to be rotated periodically at a rotation frequency which can particularly range from several kHz to tens kHz, that is, the rotation frequency can range from thousands of Hz to tens of thousands of Hz.

It shall be appreciated that FIG. 5 and FIG. 6 merely illustrates schematically the examples of the optical lens, the light guiding element, and the light path including them, in the light source assembly according to some embodiments of the disclosure, but the light source assembly according to the embodiments of the disclosure can particularly further include an array of laser devices, a fluorescence wheel, a convex lens, a concave lens, a coated lens, a group of condenser lenses, and other optical lens. It shall be further noted that the light path of the light source assembly according to the embodiments of the disclosure particularly may or may not be designed the same as the laser light source assembly in the prior art, so the embodiments of the disclosure will not be limited to any particular design of the light path of the laser light source assembly, and any particular optical elements in the laser light source assembly.

In some particular embodiments of the disclosure, the light guiding element can be driven by a driving element to move, where the driving element can be a component in the light guiding element, or can be a separate element connected with the light guiding element. For example, the driving element can be an electromagnetic coil or a piezoelectric ceramic element connected with the light guiding element through a clamping structure (e.g., a support frame, etc.)

Furthermore the driving element can be controlled by a controlling element, where particularly, for example, the controlling element controls the driving element with a signal by outputting driving current (e.g., a PWM wave) corresponding to the signal, so that the light guiding element is driven to be moved in response to the varying driving current; and in another example, the controlling element controls the driving element with a preset piece of software to drive the light guiding element to move accordingly.

Optionally the controlling element can be a CPU controller configured to output a control signal to the driving element.

Optionally in some embodiments of the disclosure, the light guiding element can be configured to be rotated around a rotation axis which can be parallel to the plane where the light guiding element lies.

Particularly, for example, (a), (b), and (c) of FIG. 7 illustrate schematic diagrams of the light guiding element being driven to be moved.

(a) of FIG. 7 illustrates the light guiding element which can particularly be driven to be rotated around a first rotation axis a according to some embodiments of the disclosure, where the first rotation axis a is parallel to the plane where the light guiding element lies; and (b) of FIG. 7 illustrates the light guiding element which can particularly be driven to be rotated around a second rotation axis b according to some further embodiments of the disclosure, where the second rotation axis b is parallel to the plane where the light guiding element lies.

(c) of FIG. 7 illustrates the light guiding element which can particularly be driven to be moved around both the rotation axes as illustrated in (a) and (b) of FIG. 7 according to some further embodiments of the disclosure. As can be apparent, if the light guiding element is driven to be moved around both the rotation axes as illustrated in (a) and (b) of FIG. 7, then the center of the spot on the optical lens resulting from the laser light beam incident onto the optical lens can move uniformly, for example, so that the spot can move in the range of a circle centered at the initial position.

Here if the light guiding element is driven to be rotated around the single rotation axis as illustrated in (a) or (b) of FIG. 7, then the light guiding element will be driven to be rotated in one dimension, that is, the light guiding element will be driven to be rotated along a movement locus in a plane; and if the light guiding element is driven to be rotated in both the axes as illustrated (a) and (b) of FIG. 7, then the light guiding element will be driven to be rotated in two dimensions, that is, the light guiding element will be driven to be rotated along a movement locus in a three-dimension space.

Since the optical performance of 10% of the circumferential area from the edge of the optical lens may be so degraded as compared with that in the circumferential area at the center thereof due to the designing and processing thereof that, for example, there is an aberration occurring, the efficiency of processing the light at the center of the optical lens is the highest. Furthermore in some embodiments of the disclosure, the light guiding element shall be driven to be moved to thereby guide the laser light beam incident onto the optical lens so that the movement locus of the spot on the optical lens resulting from the incident laser light beam is restrained within 95% of the entire area of the optical lens in such a way that the spot will neither fall out of such an area on the optical lens that there is a high capacity of processing the light, nor closely approach the edge of the optical lens, so that the position of the spot can move without degrading the efficiency of the optical lens in processing the laser light beam.

Optionally in some embodiments of the disclosure, the light guiding element can be driven to be moved periodically, or can be driven to be moved aperiodically.

For example, the light guiding element can move upon arrival of each preset length of time; and in another example, the light guiding element can be controlled to move, according to an optical attenuation condition of the optical lens, for example, the light guiding element can be controlled to move, upon detecting a drop of 10-20% of the transmittivity of the optical lens.

Optionally the light guiding element can be driven to be moved at a constant speed or a varying speed. For example, the movement speed of the light guiding element can be adjusted according to the optical attenuation condition.

Here the optical attenuation of the optical lens in the laser light source assembly results from the illuminating laser in that if some position on the optical lens has been illuminated by the laser for a long period of time, then the optical lens will be fogged at the position, thus degrading the transmittivity, where the optical attenuation condition of the optical lens can be represented as a percentage by which the transmittivity of the optical lens drops.

Optionally in some embodiments of the disclosure, the incident laser light beam of the light guiding element is parallel laser light beams. Optionally in some embodiments of the disclosure, the emergent laser light beam of the light guiding element is parallel laser light beams.

Particularly the light guiding element can be arranged before such an optical lens in the light path of the laser light source assembly that illuminated by the parallel laser light beams. For example, in the light path section shaping the laser light beam as illustrated in FIG. 3, the light guiding element can particularly be arranged between the concave lens 203 as illustrated in FIG. 3, and such an optical lens that receives the emergent laser light beam of the concave lens 203.

Further to the schematic diagram of the light path section shaping the laser light beam as illustrated in FIG. 3, FIG. 8 illustrates a schematic diagram of the light path section shaping the laser light beam as illustrated in FIG. 3, to which some embodiments of the disclosure in which the light guiding element is a transmissive element as illustrated in FIG. 5 are applicable. FIG. 9 illustrates a schematic diagram of the light path section shaping the laser light beam as illustrated in FIG. 3, to which some embodiments of the disclosure in which the light guiding element is a reflective element as illustrated in FIG. 6 are applicable.

As illustrated in FIG. 8, in the light path section shaping the laser light beam, the light guiding element is such a transmissive element 701 arranged between a concave lens 703 and an optical lens 704 that is driven to be rotated.

As illustrated in FIG. 8, the parallel laser light beams incident onto a convex lens 702 are converged, and arrive at the concave lens 703, and the concave lens 703 diffuses the light beams tending to be converged, thus resulting in parallel laser light beams with a smaller area, so that the parallel laser light beams are incident perpendicularly onto the transmissive element 701, and transmitted through the transmissive element 701, and then exits in parallel to the optical lens 704 (an emergent light beam represented as a solid line in FIG. 8), thus resulting in a spot at some position on the optical lens 704; and after the transmissive element 701 is driven to be rotated (the transmissive element 701 is rotated at an angle ω as illustrated in FIG. 8), the transmissive element 701 is inclined relative to the direction in which the laser light beam is incident, so that the laser light beam will not be incident perpendicularly onto the surface of the transmissive element 701 any longer, but will be incident thereon at some angle from the surface of the transmissive element 701. Since there is some thickness of the transmissive element 701, the laser light beam transmitted inside the material of the transmissive element 701 is refracted, and then is refracted again on and exits from the other surface under the refraction law, where the emergent laser light beam (an emergent light beam represented as a dotted line in FIG. 8) is translated relative to the original emergent light beam (an emergent light beam represented as a solid line in FIG. 8), so that the position of the light beam incident onto the surface of the optical lens 704 will be changed accordingly, thus resulting in a spot at another position on the optical lens 704 as illustrated in FIG. 8.

As illustrated in FIG. 9, in the light path section shaping the laser light beam, the light guiding element is such a reflective element 801 arranged between a concave lens 803 and an optical lens 804 that can be driven to be rotated.

As illustrated in FIG. 9, the parallel laser light beams incident onto a convex lens 802 are converged, and arrive at the concave lens 803, and the concave lens 803 diffuses the light beams tending to be converged, thus resulting in parallel laser light beams with a smaller area, so that the parallel laser light beams are reflected by the reflective element 801, thus resulting in a spot at some position on the optical lens 804 (an emergent light beam represented as a solid line in FIG. 9); and the reflective element 801 is driven to be rotated (the reflective element 801 is rotated at an angle θ as illustrated in FIG. 9), thus changing the incidence angle at which the laser light beam is incident onto the surface of the reflective element 801. Under the reflection law, due to this change to the incidence angle, the angle at which the laser light beam exits the surface of the reflective element 801 is changed accordingly (an emergent light beam represented as a dotted line in FIG. 9), so the laser light beam is reflected by the rotated reflective element 801, thus resulting in a spot at another position on the optical lens 804.

In the example of the light path section shaping the laser light beam as illustrated in FIG. 3 to which the technical solutions according to the embodiments of the disclosure as illustrated in FIG. 8 and FIG. 9 are applicable, real tests can be made by taking such a measure that the light guiding element which is a plane mirror rotates at an angle ranging from −N to N degrees, where N ranges from 0.3 to 0.5, and such a measure that the light guiding element which is a plane sheet of glass rotates at an inclination angle ranging from −5 to 5 degrees in a plane normal to the direction in which the laser light beam is incident, so that the spot on the optical lens resulting from the laser light beam incident onto the optical lens can move over a distance ranging from 0.5 to 1 millimeters; and also real test can be made in which if a drop of 10% of the transmittivity of the optical lens is detected, then the measures above can be made to thereby improve the transmittivity of the optical lens by 2 to 3 percentages, so that the total transmittivity of the optical lens is changed to 7 percentages, and also the lifetime thereof is improved accordingly by approximately one third.

It shall be appreciated that typically there may be a very large number of optical lens in the real light source light path of the light source assembly according to the embodiments of the disclosure, where a light guiding element can be arranged before one or more of these optical lens to thereby improve the service lifetime of the light source assembly accordingly.

For example, the light source assembly according to some embodiments of the disclosure can further include an array of monochromatic laser devices, where a light path over which the laser is transmitted through the array of monochromatic laser devices may or may not be designed the same as the light path of the laser light source assembly in the monochromatic light source architecture in the prior art.

Optionally in the light source assembly including the array of monochromatic laser devices according to some embodiments of the disclosure, there are a first optical lens and a second optical lens arranged on the light path over which the laser emitted by the array of monochromatic laser devices is transmitted, and particularly a light guiding element can be arranged, for example, between the array of monochromatic laser devices and the first optical lens, and/or between the first optical lens and the second optical lens.

In another example, the light source assembly according to some embodiments of the disclosure can further include a first array of laser devices, and a second array of laser devices, which are arrays of monochromatic laser devices in two different colors, and particularly their light paths over which the laser is transmitted may or may not be designed the same as the light path of the laser light source assembly in the dichromatic light source architecture in the prior art. For example, their light paths may be designed the same as the light path of the laser light source assembly in the dichromatic light source architecture as illustrated in FIG. 4.

Optionally in the laser light source assembly including the first array of laser devices, and the second array of laser devices according to some embodiments of the disclosure, there are a first optical lens and a second optical lens arranged on the light path over which the laser emitted by the first array of laser devices is transmitted, and a third optical lens and a fourth optical lens arranged on the light path over which the laser emitted by the second array of laser devices is transmitted, and particularly a light guiding element can be arranged, for example, at one or more of positions between the first array of laser devices and the first optical lens, between the first optical lens and the second optical lens, between the second array of laser devices and the third optical lens, and between the third optical lens and the fourth optical lens.

By way of an example, further to the schematic structural diagram of the laser light source assembly in the dichromatic light source architecture as illustrated in FIG. 4, FIG. 10 illustrates a schematic structural diagram of a light source assembly in a dichromatic light source architecture according to some embodiments of the disclosure. Like the laser light source assembly illustrated in FIG. 4, the light source assembly according to some embodiments of the disclosure includes a number of convex lens, concave lens, coated lens, a group of condenser lens, etc., where the laser light source assembly includes a blue laser light emitter (a first array of laser devices 901), a red laser light emitter (a second array of laser devices 902), and a fluorescence wheel 903 on which there are arranged a blue light transmissive area, and a fluorescence powder area including fluorescence powder including at least green fluorescence powder configured to be excited to generate green fluorescence to be mixed with red laser and blue laser into white light.

In the light source assembly in the dichromatic light source architecture according to some embodiments of the disclosure as illustrated in FIG. 10, like the light path over which the laser light beam is transmitted in FIG. 4, a laser light beam emitted by the first array of laser devices 901 is shaped by a first convex lens 904 (i.e., a first optical lens) by being narrowed into a smaller spot arriving at a dichroic lens 907 (i.e., a second optical lens), and a laser light beam emitted by the second array of laser devices 902 is shaped by a second convex lens 905 (i.e., a third optical lens) by being narrowed into such a smaller spot that is reflected by a reflective lens 906 (i.e., a fourth optical lens), arrives at the dichroic lens 907, passes the dichroic lens 907, a focusing lens 908, and a diffusion sheet 909, and then is incident onto the fluorescence wheel 903. The fluorescence wheel 903 emits fluorescence so that the fluorescence is transmitted to the backside of the fluorescence wheel (which is a transmissive fluorescence wheel including a transparent substrate and a layer of fluorescence powder), passes the group of condenser lens 910, and then is transmitted together with blue laser and red laser to an optical rod 913 over the same light path (including a reflective lens 911 and a focusing lens 912) for the purpose of being equalized.

Particularly in the light path of the light source assembly as illustrated in FIG. 10, there may be light guiding elements arranged in the light path over which the laser light beams exit in parallel, and particularly as illustrated in FIG. 10, a light guiding element 914 can be arranged between the first array of laser devices 901 and the first convex lens 904, a light guiding element 915 can be arranged between the first convex lens 904 and the dichroic lens 907, a light guiding element 916 can be arranged between the second array of laser devices 902 and the second convex lens 905, a light guiding element 917 can be arranged between the second convex lens 905 and the reflective lens 906, etc.

As can be apparent from the description above, in the light source assembly according to the embodiments of the disclosure, a light guiding element, arranged on the side of the optical lens where the laser light beam is incident, is configured to be moved to thereby guide the laser light beam, which needs to be incident onto the optical lens, to be translated, or to be incident in a changed direction, so that the laser light beam incident onto the optical lens can illuminate the optical lens, thus resulting in a spot at a different position on the optical lens. As can be apparent, in the light source assembly according to the embodiments of the disclosure, the light guiding element, and the movement of the light guiding element can be arranged so that the laser light beam illuminates the optical lens at a varying position thereon, thus avoiding the high-energy laser light beam from illuminating the same position on the optical lens for a long period of time so as to alleviate the local optical characteristic from being degraded, and to slow down aging of the optical lens; and also to make full use of the other peripheral area of the optical lens for the effect of improving the service lifetime of the optical lens. Accordingly the improved service lifetime of the optical lens can also facilitate an improved service lifetime of the product as a whole, and enhanced competitiveness of the product.

Furthermore although the laser light source is an excellent coherent light source with good monochromaticity, strong directivity, a high optical flux, and other advantages, high coherency of the laser may also come with a speckle effect in displaying by projecting the laser, where the so-called speckle effect refers to that if a coherent light source illuminates a coarse object, e.g., a projection screen which generates diffuse reflection, then scattered light at the same wavelength and with constant phases will interfere with each other in the space, where some light interfering with each other are enhanced, and some light interfering with each other are cancelled off, in the space, thus resulting in such alternately bright and dark granular spots, which are defocused, on the screen that appear flicking to human eyes, so that a user who has watched them for a long period of time may easily feel giddily uncomfortable, thus further degrading the quality of a projected image, and discouraging the experience of the watching user.

From the perspective of suppressing the speckle effect, typically the diffused spots are shrunk through spatial superimposition; the diffused spots are superimposed on each other through temporal averaging, so that the contrast of the diffused spots is lowered below a range of being recognizable to human eyes, and weakened through integration by the human eyes; or the coherence of the light source is lowered by extending the width of the spectrum, or weakened through superimposition in frequency. For example, in the prior art, an optic fiber is used in some laser theater product to eliminate the diffused spots, but the optic fiber is costly and voluminous, thus hindering the product from being miniaturized, and popularized at home.

An embodiment of the disclosure provides another light source architecture, and particularly a projection light source which can output the three primary colors in sequence. Particularly as illustrated in FIG. 11, the light source architecture includes an array of laser devices 1001, which is a light emitter, configured to emit blue laser, and a fluorescence wheel 1004 structured as a rotating circular disk, where there is a fluorescence area in which at least two kinds of fluorescence powder capable of emitting green fluorescence and red fluorescence are arranged, and a transmissive area (not illustrated) are distributed on the circumference of the surface of the circular disk.

A laser light beam emitted from the array of laser devices 1001 is shaped by the light beam shaping device 1002 via being narrowed, and incident onto a light guiding element 1003 which is a transmissive element; the laser light beam is transmitted through the light guiding element 1003, and then incident onto the fluorescence wheel 1004; and as the fluorescence wheel 1004 is rotating, the laser light beam is incident sequentially onto the fluorescence area and the transmissive area of the fluorescence wheel 1003, where the laser light beam incident onto the fluorescence area excites the fluorescence powder to emit fluorescence in a corresponding color, and the laser light beam incident onto the transmissive area is transmitted directly through and exits the fluorescence backside of the fluorescence wheel. The fluorescence wheel 1004 is such a transmissive fluorescence wheel that the fluorescence resulting from the fluorescence powder being excited also exits the backside of the fluorescence wheel together with the laser light beam in the same direction in which the laser light beam exits.

Here there are groups of collimating lenses 1005 arranged on both the incidence side and the exit side of the fluorescence wheel 1004, where the collimating lens or the group of collimating lenses located on the front incidence side of the fluorescence wheel is configured to collimate the incident laser light beam, and the group of collimating lenses located on the back emergent side of the fluorescence wheel is configured to collimate and converge the diffused emergent laser light beam and fluorescence light beam into light beams in parallel to exit. The laser light beam and the fluorescence light beam, both of which are merged, are filtered by a color filter wheel 1007 to thereby improve the purity of the color of the fluorescence, and the resulting light beam enters an optically equalizing component 1008 which is typically an optical rod. In order to improve the amount of light entering the optically equalizing component 1008, typically there is further arranged a light narrowing lens 1006 arranged, before the resulting light beam is incident onto the color filter wheel 1007 or the optically equalizing component 1008, to narrow the angle at which the light beam is diverged, so that the converged light beam enters the optically equalizing component 1008.

In the light source architecture above, the light guiding element 1003 is driven to be moved periodically or aperiodically to thereby guide the blue laser light beam to exit in a changed direction. As illustrated in FIG. 11, the light guiding element 1003 is driven to be rotated at an angle of δ around a rotation axis parallel to the plane where the light guiding element 1003 lies.

FIG. 12 illustrates a schematic structural diagram of a light guiding element.

The light guiding element 1003 is a transmissive element, and can particularly be a diffusion sheet, where there are scattering particles arranged on the side thereof where the laser light beam is incident, or the light guiding element 1003 can be a diffraction binary phase sheet configured to change the phase of the laser light beam transmitted through the diffraction binary phase sheet under the diffraction principle.

In a particular implementation, the light guiding element 1003 can be driven by a driving element to move, where the driving element can be a component in the light guiding element, or can be a separate element connected with the light guiding element. For example, the driving element can be an electromagnetic coil or a piezoelectric ceramic element connected with the light guiding element through a clamping structure (e.g., a support frame, etc.)

Furthermore the driving element can be controlled by a controlling element, where particularly, for example, the controlling element controls the driving element with a signal by outputting driving current (e.g., a PWM wave) corresponding to the signal, so that the light guiding element is driven to be moved in response to the varying driving current; and in another example, the controlling element controls the driving element with a preset piece of software to drive the light guiding element to move accordingly.

Optionally the controlling element can be a CPU controller configured to output a control signal to the driving element.

In the schematic structural diagram illustrated in FIG. 12, the driving element is a component of the light guiding element. Particularly the central section of the light guiding element 1003 is a transmissive area 1031 outside which there is a driver structure 1032 arranged to drive the transmissive area 1031 to rotate.

Since when the diffusion sheet or the diffraction binary phase sheet itself is in stationary state, the incident laser light beam can be diffused or diffracted under the scattering principle or the diffraction principle to thereby change the spatial phase of the emergent light beam, and while the laser light beam is being guided to be transmitted as the light guiding element 1003 is being rotated, the angle at which the laser light beam exits can be changed at the same frequency in response to the varying movement direction, so that on one hand, the divergence of the laser light beam can be improved to thereby diversify the divergence angle, and on the other hand, the position of the spot of the exiting laser light beam can be changed relative to the emergent position at a previous instance of time along with the movement of the light guiding element, and also the energy of the spot of the emergent laser light beam can be equalized, and the centralized distribution of the energy of the Gaussian-type laser light beam with a single optical axis of 0 degree is changed; and a number of light beams diverged at different angles from the optical axis can be produced to thereby improve the random distribution or the equalization of the energy of the laser light beam, and the speckle effect arising from the distribution characteristic of the Gaussian-type laser light beam is eliminated.

An embodiment of the disclosure provides another light source architecture.

As illustrated in FIG. 13, the light source assembly includes light emitter in two colors. Particularly an array of laser devices 1101 provides blue laser, and an array of laser devices 1102 provides red laser.

The blue laser passes a light beam shaping component 1103, and arrives at a dichroic mirror 1104, where the light beam shaping component 1103 can be a telescope system including a convex lens and a concave lens, and can narrow a laser light beam. The narrowed blue laser light beam is further transmitted to a fluorescence wheel 1105. The fluorescence wheel 1105 is particularly a reflection fluorescence wheel to be driven to be rotated, which has a circular disk-shaped wheel surface on which a fluorescence powder area and a laser transmissive area are circumferentially distributed, where the fluorescence powder area is coated with green fluorescence powder, or green fluorescence powder and yellow fluorescence powder, and the laser transmissive area is configured to transmit blue laser. The blue laser is transmitted through a group of collimating lenses (not illustrated) arranged on the front face of the fluorescence wheel 1105, thus resulting in a smaller laser spot, where the laser spot is incident sequentially on the fluorescence powder area and the laser transmissive area as the body of the wheel is being rotated. The fluorescence powder in the fluorescence powder area is excited to emit fluorescence in a corresponding color, where the three primary colors of red, green, and blue, or the four primary colors of red, green, blue, and yellow are produced from the fluorescence together with the blue laser and the red laser, and output in sequence. The blue laser transmitted from the laser transmitting area is returned again to the dichroic mirror 1104 through a group of relaying lens 1109 arranged on the backside of the fluorescence wheel 1105, and transmitted again through the dichroic mirror 1104.

There is a such a highly reflective film or a highly reflective mirror arranged on the surface of the body of the fluorescence wheel 1105 that can reflect the fluorescence arising from being excited, so that the fluorescence exits in an opposite direction to the blue laser light beam, and arrives at the dichroic mirror 1104, where the dichroic mirror 1104 can reflect the green fluorescence, or the blue fluorescence and the yellow fluorescence.

The red laser is reflected the light beam shaping component 1103, passes the reflective mirror 1111, then arrives at a dichroic mirror 1110, and is further transmitted to the dichroic mirror 1104 through the dichroic mirror 1110, where the dichroic mirror 1104 can transmit the blue light and the red light, and the dichroic mirror 1110 can transmit the red light, and reflect the blue light, the green light, or the green light and the yellow light.

With reflection and transmission of the dichroic mirror 1104, the red laser, the blue laser, the green fluorescence, or the green fluorescence and the yellow fluorescence are merged and transmitted to an optically equalizing component 1108 for being optically equalized.

A light guiding element 1106, further arranged before the resulting light beam arrives at the optically equalizing component 1108 through a converging lens 1107, can be embodied as the light guiding element 1003 illustrated in FIG. 11 and FIG. 12.

Particularly the light guiding element 1106 can rotate at an angle which can ranging from −5 to 5 degrees, where if it rotates at an angle beyond that range, then there will be easily a too large area of the exit spot, thus degrading the efficiency of processing the light by an optical lens following the light guiding element 1106.

Optionally in some embodiments of the disclosure, the light guiding element is a transmissive element made of the same transparent material with a uniform thickness, e.g., a diffusion sheet. Furthermore due to the Gaussian distribution of the laser light beam, scattering particles with different divergence angles can be arranged respectively on the periphery and the central section of the diffusing sheet, where the divergence angle of the laser light beam in the central section is larger than the divergence angle thereof in the peripheral area, thus improving the divergence of the laser light beam proximate to the optical axis of 0 degree where the energy is relatively concentrated.

Optionally in some embodiments of the disclosure, the light guiding element can be driven to be rotated around a rotation axis which can be parallel to the plane where the light guiding element lies. Particularly (*a*), (*b*), and (*c*) of FIG. 7 illustrate schematic diagrams of the light guiding element being driven to be moved.

Optionally in some embodiments of the disclosure, the light guiding element 1106 can be driven to be flipped and vibrated in one dimension or two dimensions. The vibration in two dimensions can improve the diversity of the movement directions of the element to thereby further diversify the divergence of the laser light beam.

As illustrated in FIG. 14*a*, the light guiding element can be flipped and vibrated in the left-right direction in one dimension along the axis a, or in an inward to outward direction relative to the paper in one dimension along the axis b.

Optionally the light guiding element can be flipped and vibrated along the axis a and the axis b sequentially or concurrently, that is, vibrated in two dimensions.

If the light guiding element rotates in two dimensions, then preferably a first vibration direction will be orthogonal to a second vibration direction, and the light guiding element will vibrate in the first vibration direction, e.g., along the axis a, and resonate in the second vibration direction, e.g., along the axis b, thus alleviating a stress arising from the vibrations of the light guiding element concurrently or sequentially in the two directions so as to improve the reliability of the light guiding element in operation.

The rotation axis of the light guiding element can be a symmetric axis of the element, or as illustrated in FIG. 14b, the rotation axis can be a tangent to the edge of the transmissive area of the light guiding element, or one side of the rectangle, where the light guiding element illustrated in FIG. 14b can also vibrate concurrently along the axis a and the axis b as described above.

FIG. 7, FIG. 14a and FIG. 14b illustrate several schematic diagrams of movement which may or may not be periodical.

If the movement is periodical, then the frequency at which the light guiding element rotates or vibrates will be higher than the frequency at which the light source is illuminating, for example, if the frequency at which the light source is illuminating is 120 Hz, then the frequency at which the light guiding element rotates or vibrates will range from hundreds of Hz or tens of KHz; if the light guiding element is driven by an electromagnetic coil, then the frequency at which the light guiding element rotates or vibrates will range from 300 to 500 Hz; and if the light guiding element is driven by a piezoelectric ceramic element, then the frequency at which the light guiding element rotates or vibrates will range from several kHz to tens of kHz, that is, the frequency can range from an order of kHz to an order of ten kHz. Alternatively the frequency at which the light guiding element vibrates can be lower than the frequency at which the light source is illuminating, and as the frequency at which the light guiding element vibrates is rising, the frequency at which the light guiding element changes the angle of the emergent light beam will also be rising therewith, thus further facilitating a number of emergent angles produced in a unit of time so as to vary the energy distribution of the laser light beam.

If the movement is aperiodical, then the light guiding element will rotate or vibrate more randomly, so the angle of the laser light beam transmitted through the light guiding element will be more diversified, thus further suppressing the speckle effect.

In the Gaussian distribution of the laser light beam as illustrated in FIG. 17, the energy of the light proximate to the optical axis of 0 degree is relatively concentrated, and under the interference principle, if there is a stable phase or phase difference at the same incidence angle, then such interference will occur that may result in serious speckle phenomenon while a projected image is being produced from the light source.

In this example, the diversity of the angle of the emergent laser light beam is improved with the transmissive light guiding element in movement, as will be described below in details with reference to FIG. 17, FIG. 18a, FIG. 18b, FIG. 19a, and FIG. 19b.

As illustrated in FIG. 18a, the traverse axis represents the angles of the respective light beams deviating from the optical axis, and the vertical axis represents the energy at the respective angles. If the laser light beam passes a diffusion sheet component which is rotating, then the diffusion sheet component which is rotating will improve the divergence angle of the light beam, thus resulting in a larger spot, and as compared with FIG. 17, there are a number of divergence angles, and some low energy peak without departing from the Gaussian distribution of the light beam.

With the light guiding element according to the embodiments of the disclosure, for example, there is such a receiving surface of the laser light beam that the light beam rotates at different angles, e.g., 0, 90, 180, and 270 degrees, given the same azimuth angle (which refers to the divergence angle of the light beam deviating from the optical axis of 0 degree) on the receiving surface, so that there are four different angle vis energy distribution curves (represented in four different gray levels) as illustrated in FIG. 18b, where if there are larger differences between these curves, then the energy of the respective angles will be distributed more randomly, so that the contrast of the diffused spot will be reduced to one N-th the original contrast thereof as defined for the contrast of the diffused spot, thus achieving a better effect of suppressing the speckle effect.

FIG. 19a and FIG. 19b illustrate diagrams of comparing the effects of suppressing the speckle effect using the general rotating diffusion sheet, and the light guiding element according to the embodiments of the disclosure respectively.

As can be apparent from the description above of the movement of the light guiding element, and the suppression of the speckle effect, there can be a better effect of suppressing the speckle effect of the laser light beam using the light guiding element. Referring to FIG. 13, if the light guiding element 1106 is arranged before the incident light path of the optically equalizing component, in the output light path of the optically merging component and the dichroic lens 1104, then the diffused spots of the blue laser and the red laser in the light path of optically merging will be suppressed, although the arrangement of the light guiding element in the light path of the light source assembly will not be limited thereto. In order to improve the effect of suppressing the diffused spot of the monochromatic laser light beam, the light guiding element can alternatively be arranged between the dichroic lens 1104 and the light beam shaping component 1103 in the light path of the blue laser, or between the dichroic lens 1104, and the group of collimating lens on the front side of the fluorescence wheel 1105, or between the mirror 1111 and the light beam shaping component 1103 in the light path of the red laser, or between the dichroic lens 1110 and the dichroic lens 1104, where if the light guiding element is arranged between the dichroic lens 1110 and the dichroic lens 1104, then the blue laser light beam returned from the backside of the fluorescence wheel 1105, and the red laser light beam reflected by the mirror 1111 will be merged by the dichroic lens 311, so that the diffused spots of the laser in the two colors can be suppressed, thus reducing the number of light guiding elements to be arranged separately in the light paths of the blue laser and the red laser Since the light guiding element can diffuse the light beam, preferably such a light narrowing element, e.g., a convex lens component, is further arranged after the light guiding element that narrows the light to thereby reduce the divergence angle of the light beam so as to improve the utilization ratio of the light beam at the backend, thus alleviating the loss of the light.

Since the size of the light guiding element is smaller, preferably the light beam needs to be narrowed, or the divergence angle thereof needs to be reduced, before it is incident onto the light guiding element, so that the entire area of the spot can be received in the transmissive area of the light guiding element.

FIG. 15 illustrates a schematic diagram of another dichromatic light source architecture.

The dichromatic light source architecture illustrated in FIG. 15 includes an array of blue laser devices 1201 configured to emit a blue laser light beam, an array of red laser devices 1202 configured to emit a red laser light beam, and a fluorescence wheel 1207 which is a transmissive fluorescence wheel made of such a transparent matrix material that a dichroic film capable of transmitting laser and reflecting fluorescence is arranged on the side surface thereof where the laser is incident, where the wavelength range of the laser is different from the wavelength range of the fluorescence. A fluorescence powder area coated with fluorescence powder, and a laser transmissive area are arranged in that order in the circumferential direction on the surface of the fluorescence wheel 1207, where the fluorescence powder may be green fluorescence powder, or blue fluorescence powder and yellow fluorescence powder. The laser transmissive area includes a blue laser transmissive area and a red laser transmissive area.

The two arrays of blue and red laser devices are arranged perpendicular to each other, and the laser emitted by the arrays of laser devices is merged by a dichroic lens 1204 with such a wavelength selectivity characteristic that transmits the blue laser and reflects the red laser. Before the laser light beams in the two colors are incident onto the dichroic lens 1204, they are further converged respectively, for example, they are narrowed by a convex lens 1203 as illustrated. After the blue laser and the red laser is merged by the dichroic lens 1204, the converged blue and red laser light beams further pass a concave lens 1205, and exits the concave lens 1205, thus resulting in parallel light beams with a smaller spot area than the area of the spot exiting the laser devices.

Here a light guiding element 1206, arranged between the concave lens 1205 and the fluorescence wheel 1207, can be embodied as the light guiding element 1003 in FIG. 11, or the light guiding element 1106 in FIG. 13, although a repeated description of the structure and movement pattern thereof will be omitted here.

The light guiding element 1206 can receive the blue laser light beam and the red light beam sequentially in the order that the array of blue laser devices 1201 and the array of red laser devices 1202 are lightened, so that the diffused spots of the laser light beams in the two colors can be suppressed.

If the array of blue laser devices is lightened, then the blue laser will be transmitted through the light guiding element 1206, and as the fluorescence wheel 1207 is rotating, the blue laser will be incident sequentially onto the fluorescence powder area on the front side of the fluorescence wheel 1207, and the blue laser transmissive area. The fluorescence arising from being excited is reflected by the dichroic film, passes the transparent base material, and exits the backside of the fluorescence wheel 1207. If the blue laser is incident onto the blue laser transmissive area, then the blue laser will exit directly the backside of the fluorescence wheel 1207.

If the array of blue laser devices is disabled, then the array of red laser devices will be lightened, and emit the red laser light beam incident onto the surface of the fluorescence wheel 1207 over a path similar to the blue laser light beam, where only if the fluorescence wheel 1207 rotates to the red laser transmissive area, then the red laser light beam, which is not an excited light beam, will be incident thereon, and exit directly the backside of the fluorescence wheel 1207.

The incident blue laser and red laser is collimated by groups of collimating lens 1208 on the front side and the backside of the fluorescence wheel 1207, and the green fluorescence, or the green fluorescence and the yellow fluorescence is collimated by the group of collimating lens 1208 on the backside of the fluorescence wheel 1207.

Thus the light in the primary colors can exit the backside of the fluorescence wheel 1207 in sequence, and can be converged by a converging lens 1209, and then enter an optically equalizing component 1210 for being equalizing to thereby improve the illumination by the light source assembly.

In the light source architecture according to this embodiment, the light guiding element is arranged in the light path of optically merging for the laser devices in the two colors, so that the diffused spots of the laser in the two colors can be suppressed to thereby reduce the number of elements in use so as to simplify the light source architecture, and to decrease the volume thereof.

The light guiding element 1206 is driven to be vibrated to thereby change the emergent angle of the laser light beam at the same frequency in response to the varying movement direction thereof while the laser light beam is being guided to be transmitted, so that on one hand, the divergence of the laser light beam can be improved to thereby diversify the divergence angle, and on the other hand, the position of the spot of the emergent laser light beam can be changed relative to the emergent position at a previous instance of time along with the movement of the light guiding element, and also the energy of the spot of the emergent laser light beam can be equalized, and the centralized distribution of the energy of the Gaussian-type laser light beam with a single optical axis of 0 degree is changed; and a number of light beams diverged at different angles from the optical axis can be produced to thereby improve the random distribution or the equalization of the energy of the laser light beam, and the speckle effect arising from the distribution characteristic of the Gaussian-type laser light beam is alleviated.

FIG. 16 illustrates a schematic diagram of a trichromatic light source architecture.

As illustrated in FIG. 16, the architecture includes a blue laser device 1301, a red laser device 1302, and a green laser device 1303 configured to emit blue, red, and green laser respectively, where the blue laser of the blue laser device 1301, and the red laser of the red laser device 1302 are merged by a first optically merging mirror 1304, incident onto a second optically merging mirror 1305, and merged with the green laser by the second optically merging mirror 1305, so that the light in the three colors is mixed into white light.

There are further arranged a light guiding element 1306, a converging lens 1307, and an optically equalizing component 1308 in an output light path of the light into which the laser in the three colors is merged, and particularly the light guiding element 1306 can be embodied as the light guiding element in any one of the embodiments above, and the structure, movement pattern, and operating process thereof can be similar to those in any one of the embodiments above except that in this embodiment of the disclosure, the light guiding element 1306 is arranged in the light path of optically merging for the laser in the three colors, unlike the light guiding element arranged in the light path over which the laser in one color, or the laser in two colors is transmitted in any one of the embodiments above, in this embodiment, the light guiding element can suppress the diffused spots of the laser in the three colors, so that the efficiency of suppressing the diffused spots in the light source system as a whole can be improved, there may be a smaller number of components, the light source assembly can be simplified in structure, and if the light source assembly is used as a projection light source, then the speckle effect of a projected image will be greatly suppressed.

In the light source assembly according to the embodiments of the disclosure, there is a such a light guiding element, arranged in the light path over which the laser light beam is transmitted, is configured to be vibrated to thereby change the emergent angle of the laser light beam at the same frequency in response to the varying movement direction thereof while the laser light beam is being guided to be transmitted, so that on one hand, the divergence of the laser light beam can be improved to thereby diversify the divergence angle, and on the other hand, the position of the spot of the emergent laser light beam can be changed relative to the emergent position at a previous instance of time along with the movement of the light guiding element, and also the energy of the spot of the emergent laser light beam can be equalized, the centralized distribution of the energy of the Gaussian-type laser light beam with a single optical axis of 0 degree is changed; and a number of light beams diverged at different angles from the optical axis can be produced to thereby improve the random distribution or the equalization of the energy of the laser light beam, the speckle effect arising from the distribution characteristic of the Gaussian-type laser light beam is alleviated.

Based upon the same technical idea, an embodiment of the disclosure further provides a laser projector which can include the light source assembly according to any one of the embodiments above of the disclosure, where the laser projector can particularly be a laser theater, a laser TV set, or another laser projector.

FIG. 20 illustrates a laser projector according to some embodiments of the disclosure. As illustrated in FIG. 20, the laser projector includes a light source assembly 1401, an optical machine 1402, and a lens 1403.

Here the light source assembly 1401 can be the light source assembly according to any one of the embodiments above of the disclosure, and reference can be made to the embodiments above for details thereof, so a repeated description thereof will be omitted here.

Particularly the light source assembly 1401 illuminates the optical machine 1402, and the optical machine 1402 modulates a light beam of the light source assembly, and outputs it to the lens 1403 for imaging, so that the image is projected to a projection medium 1404 (e.g., a screen, a wall, etc.), thus resulting in the projected image.

If the light guiding element in the light source assembly 1401 is arranged at the side, where the light beam is incident, of the optical lens arranged in the light path over which the light beam is transmitted in the light source assembly 1401, then the laser light beam will be incident onto the optical lens at a changed position, thus avoiding the high-energy laser light beam from illuminating the same position on the optical lens for a long period of time so as to alleviate the local optical characteristic from being degraded, and to slow down aging of the optical lens; and also to make full use of the other peripheral area of the optical lens for the effect of improving the service lifetime of the optical lens. Accordingly the improved service lifetime of the optical lens can also facilitate an improved service lifetime of the product as a whole, and enhanced competitiveness of the product.

If the light guiding element in the light source assembly 1401 is driven to be vibrated, then the speckle effect of the light source assembly will be alleviated to thereby improve the quality of the projected image being displayed.

The application has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A laser projector, comprising:
   an array of monochromatic laser devices in at least one color;
   a first optical lens and a second optical lens arranged in a light path where laser light of the array of monochromatic laser devices is transmitted; and
   light guiding elements configured to be driven to move to guide the laser light to be translated or transmitted in a changed direction, the light guiding elements arranged in at least one of a light path between the array of monochromatic laser devices and the first optical lens and a light path between the first optical lens and the second optical lens.

2. The laser projector according to claim 1, wherein at least one of the light guiding elements is configured to rotate around a rotation axis parallel to a plane where the at least one light guiding element lies.

3. The laser projector according to claim 1, wherein at least one light guiding element is a reflective element or a transmissive element.

4. The laser projector according to claim 3, wherein the reflective element is a plane mirror or a piezoelectric ceramic micro-electro-mechanical system.

5. The laser projector according to claim 3, wherein the transmissive element is a planar sheet of glass.

6. The laser projector according to claim 5, wherein a thickness of the planar sheet of glass is uniform.

7. The laser projector according to claim 1, wherein the laser light incident onto at least one of the light guiding elements includes parallel light rays, or wherein the laser light exiting at least one of the light guiding elements includes parallel light rays.

8. The laser projector according to claim 1, wherein at least one of the light guiding elements is configured to be driven to vibrate.

9. The laser projector according to claim 8, wherein the at least one light guiding element is configured to vibrate around a vibration axis parallel to a plane where the at least one light guiding element lies.

10. The laser projector according to claim 8, wherein the at least one light guiding element is configured to vibrate in one dimension or in two dimensions.

11. The laser projector according to claim 8, wherein the at least one light guiding element is a diffusion sheet or a diffractive element.

12. The laser projector according to claim 1, wherein at least one of the light guiding elements is a reflective element and driven to rotate at an angle between −N° and N°, and wherein N ranges from 0.3° to 0.5°.

13. The laser projector according to claim 1, wherein at least one of the light guiding element is configured to be driven to move after a transmissivity drop from 10% to 20% of the first optical lens or the second optical lens is detected.

14. A laser projector, comprising:
a first array of laser devices in at least one color, and a second array of laser devices in at least one color;
a first optical lens and a second optical lens arranged in a first light path over which laser light emitted by the first array of laser devices is transmitted;
a third optical lens and a fourth optical lens arranged in a second light path over which laser light emitted by the second array of laser devices is transmitted; and
light guiding elements configured to driven to move to guide laser light emitted by at least one of the first array of laser devices and the second array of laser devices to be translated or transmitted in a changed direction, the light guiding elements arranged in at least one of the first light path between the first array of laser devices and the first optical lens, the first light path between the first optical lens and the second optical lens, the second light path between the second array of laser devices and the third optical lens, and the second light path between the third optical lens and the fourth optical lens.

15. A laser projector, comprising:
a laser light emitter in at least one color; and
a light guiding element arranged in a light path over which laser light of the laser light emitter is transmitted, the light guiding element configured to guide the laser light to be translated or transmitted in a changed direction;
wherein the light guiding element is configured to be driven to vibrate in two dimensions, wherein vibration in a first vibration direction and vibration in a second vibration direction are harmonic motions, and wherein the first vibration direction is orthogonal to the second vibration direction.

16. A laser projector, comprising:
a first laser light emitter in a first color, and a second laser light emitter in a second color; and
a fluorescence wheel comprising a fluorescence area and a transmissive area, the fluorescence area including fluorescence powder in at least one color configured to be excited to emit fluorescence in a corresponding color;
an optically merging component configured to mix laser light emitted by the first laser light emitter in the first color, laser light emitted by the second laser light emitter in the second color, and the fluorescence emitted by the fluorescence powder; and
light guiding elements configured to be driven to vibrate to guide at least one of the laser light emitted by the first laser light emitter, the laser light emitted by the second laser light emitter and the fluorescence emitted by the fluorescence powder to be translated or transmitted in a changed direction, the light guiding elements arranged in at least one of a light path over which the laser light emitted by the first laser light emitter is transmitted between the first laser light emitter and the optically merging component, a light path over which the laser light emitted by the second laser light emitter is transmitted between the second laser light emitter and the optically merging component, and a light path of light outputted by the optically merging component.

17. A laser projector, comprising:
a first laser light emitter in a first color, a second laser light emitter in a second color, and a third laser light emitter in a third color;
an optically merging component and a beam homogenizer, laser light emitted by the first laser light emitter, laser light emitted by the second laser light emitter and laser light emitted by the third laser light emitter entering the beam homogenizer after passing the optically merging component; and
light guiding elements configured to be driven to vibrate to guide at least one of the laser light emitted by the first laser light emitter, the laser light emitted by the second laser light emitter and the laser light emitted by the third laser light emitter to be translated or transmitted in a changed direction, the light guiding elements arranged in at least one of a light path over which the laser light emitted by the first laser light emitter is transmitted between the first laser light emitter and the optically merging component, a light path over which the laser light emitted by the second laser light emitter is transmitted between the second laser light emitter and the optically merging component, a light path over which the laser light emitted by the third laser light emitter is transmitted between the third laser light emitter and the optically merging component, and adjacent one side of the beam homogenizer where the laser light emitted by the first laser light emitter, the second laser light emitter and the third laser light emitter is incident.

* * * * *